(12) United States Patent
Staib et al.

(10) Patent No.: US 8,055,548 B2
(45) Date of Patent: Nov. 8, 2011

(54) SYSTEM FOR COLLABORATIVE INTERNET COMPETITIVE SALES ANALYSIS

(75) Inventors: William E. Staib, Coralville, IA (US); Dean Scott Blodgett, Tewksbury, MA (US)

(73) Assignee: STB Enterprises, LLC, Coralville, IA (US)

( * ) Notice: Subject to any disclaimer, the term of this patent is extended or adjusted under 35 U.S.C. 154(b) by 1385 days.

(21) Appl. No.: 11/473,912

(22) Filed: Jun. 23, 2006

(65) Prior Publication Data

US 2007/0299743 A1    Dec. 27, 2007

(51) Int. Cl.
G06Q 30/00    (2006.01)

(52) U.S. Cl. ........... 705/26.1

(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 5,675,510 A | 10/1997 | Coffey et al. | |
| 5,796,952 A | 8/1998 | Davis et al. | |
| 6,108,637 A | 8/2000 | Blumenau | |
| 6,115,680 A | 9/2000 | Coffee et al. | |
| 6,138,155 A | 10/2000 | Davis et al. | |
| 6,415,322 B1 | 7/2002 | Jaye | |
| 6,643,696 B2 | 11/2003 | Davis et al. | |
| 6,763,386 B2 | 7/2004 | Davis et al. | |
| 7,441,195 B2 | 10/2008 | Error et al. | |
| 7,603,373 B2 | 10/2009 | Error et al. | |
| 2002/0007340 A1* | 1/2002 | Isaf et al. ............ 705/37 |
| 2003/0069740 A1* | 4/2003 | Zeidman ............ 705/1 |
| 2004/0059746 A1 | 3/2004 | Error et al. | |
| 2004/0064401 A1* | 4/2004 | Palaghita et al. ........ 705/38 |
| 2004/0098229 A1 | 5/2004 | Error et al. | |
| 2004/0122943 A1 | 6/2004 | Error et al. | |
| 2004/0254950 A1* | 12/2004 | Musgrove et al. ........ 707/102 |
| 2005/0216844 A1 | 9/2005 | Error et al. | |
| 2006/0149728 A1 | 7/2006 | Error et al. | |

OTHER PUBLICATIONS

Omniture S-1 filing. http://sec.gov/Archives/edgar/data/1357525/00009501490600238/f18772a1sv1za.htm Retrieved from the internet on Aug. 23, 2010. 134 pages.

Netratings Inc.—Initiating Coverage. Gould, A.S., et al. Ntexis Bleichroeder, Inc. Analyst Report. 19 pages.

Heck, Mike "Chart Your Web site's success" InfoWorld: Product Guide: Coremetrics 2005: Review. Retrieved from http://www.infoworld.com/Coremetrics_2005/56256.html?view=1&curNodeld=0 on Dec. 17, 2006. 7 pages.

Nielsen NetRatings. http://www.nielsen-netratings.com/ Retrieved from the Internet on Aug. 8, 2006, 4 pages.

(Continued)

Primary Examiner — Naeem Haq

(74) Attorney, Agent, or Firm — Dorsey & Whitney LLP

(57) ABSTRACT

A method for cataloging and reporting Internet merchant data uses a data center for receiving a plurality of site activity messages regarding two or more seller sites and provides a standardized taxonomy schema with a node for each of two or more products. The method derives from the plurality of site activity messages a sales metric for the two or more products and for a specific time period, aggregates the sales metric data for each of the two or more seller sites and the two or more products, then derives a comparative report for the sales metric for the two or more seller sites, by reference to at least one of the two or more products in the standardized taxonomy schema.

42 Claims, 19 Drawing Sheets

OTHER PUBLICATIONS

Omniture. http://www.omniture.com/company Retrieved from the Internet on Aug. 8, 2006. 3 pages.
Google Analytics http://www.google.com/analytics/ Retrieved from the Internet on Aug. 8, 2006. 1 page.
WebSideStory http://www.websidestory.com/ Retrieved from the Internet on Aug. 8, 2006. 2 pages.
CoreMetrics http://www.coremetrics.com/ Retrieved from the Internet on Aug. 8, 2006. 2 pages.
WebTrends http://webtrends.com/ Retrieved from the Internet on Aug. 8, 2006. 3 pages.
Utah Web Analytics Blog http://www.utahwebanalytics.com/blog/category/web-analytics-industry-news/ Retrieved from the Internet on Aug. 8, 2006. 6 pages.
Capterra Management Software http://www.capterra.com/catalogc-management-solutions Retrieved from the Internet on Aug. 8, 2006. 4 pages.

* cited by examiner

| Data Element | Class | Description |
| --- | --- | --- |
| customerId | string | supplied by merchant |
| dateTime | string | GMT relative |
| key | string | encrypted token supplied to merchant |
| merchantId or merchEncrypotedToken | string | supplied to merchant |
| productInformation or transactionInformation | XML | xml document containing product or transaction data |
| quantity | integer | - |
| transactionCode | string | code: Add, Remove, Ignore |
| transactionType | string | code: Normal, Customize, Summary |

FIGURE 3

Figure 4 - Product Envelope

```xml
<?xml version="1.0" encoding="UTF-8"?>
<Product>
    <Title></Title>
    <PartNumber></PartNumber>
    <Manufacturer></Manufacturer>
    <ListPrice></ListPrice>
    <Category></Category>
    <Description></Description>
    <URL></URL>
</Product>
```

Figure 5 - Transaction Envelope

```
<?xml version="1.0"
encoding="UTF-8"?>
<Transaction>
[Product Envelope – Item #1]
[Product Envelope – Item #2]
...
[Product Envelope – Item #N]
    <Summary>
        <Total></Total>
        <Shipping></Shipping>
        <Tax></Tax>
        <Discount></Discount>
        <SearchString></SearchString>
        <Referrer Source>
        </ Referrer Source >
    </Summary>
</Transaction>
```

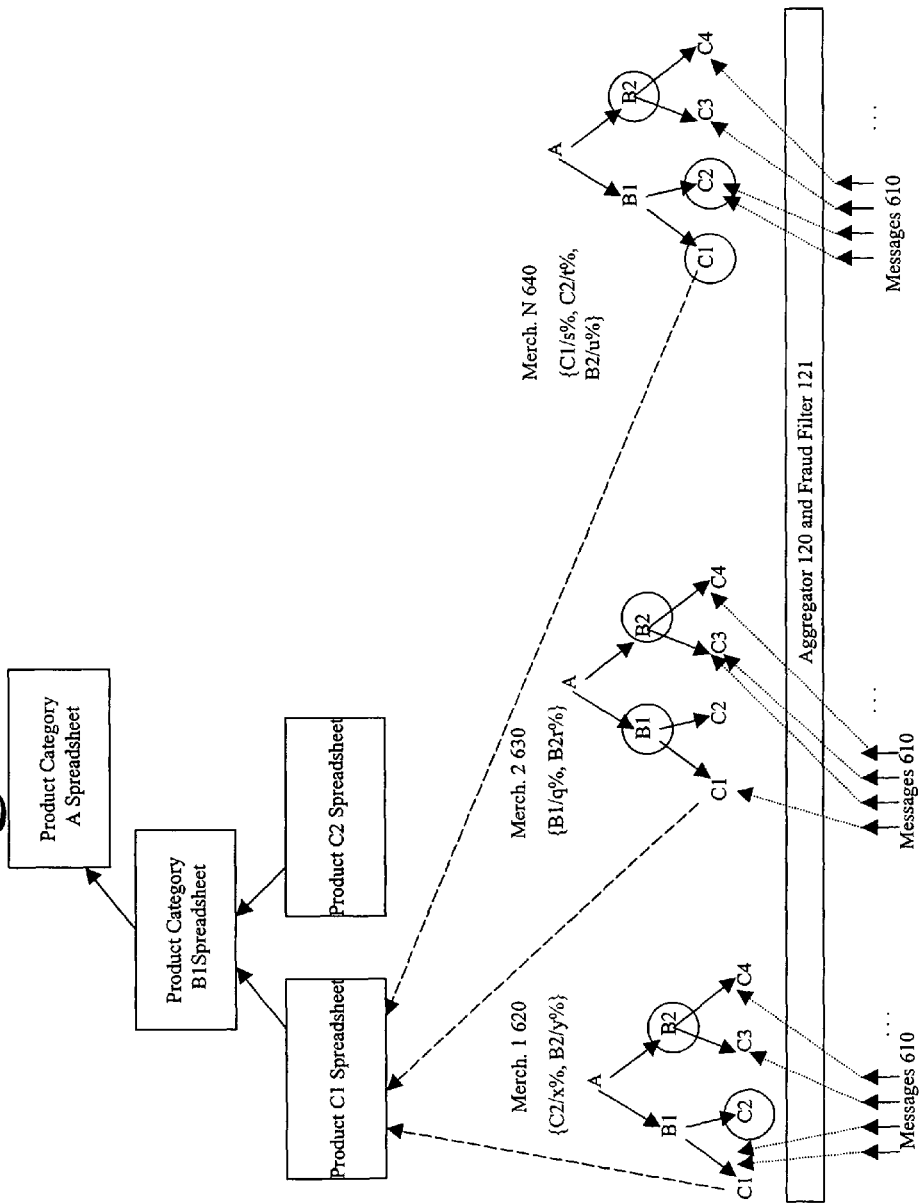
Figure 6 – Data Flow

FIGURE 7

| Merchant | Initial | | | adjustment ratio | Round2 | | | | adjustment ratio | Round3 | | | | adjustment ratio |
|---|---|---|---|---|---|---|---|---|---|---|---|---|---|---|
| | PrevSales | CurSales | % Total Sales | | PrevSales | CurSales | % Total Sales | | | PrevSales | CurSales | % Total Sales | | |
| 1 | 1000 | 50000 | 19.46% | 0.19 | 192.675 | 9633.75 | 15.56% | 0.24 | 46.42172 | 2321.086 | 0.12% | 1.00 |
| 2 | 40000 | 50000 | 22.60% | 0.17 | 6637.5 | 8296.875 | 13.42% | 0.28 | 1855.038 | 2318.797 | 4.67% | 1.00 |
| 3 | 100000 | 120000 | 56.50% | 0.07 | 6637.5 | 7965 | 13.42% | 0.28 | 1855.038 | 2226.045 | 4.67% | 1.00 |
| 4 | 0 | 900 | 0.35% | 0.00 | 0 | 0 | 0.00% | 0.00 | 0 | 0 | 0.00% | 0.00 |
| 5 | 1000 | 800 | 0.56% | 1.00 | 1000 | 800 | 2.02% | 1.00 | 1000 | 800 | 2.52% | 1.00 |
| 6 | 1000 | 1100 | 0.56% | 1.00 | 1000 | 1100 | 2.02% | 1.00 | 1000 | 1100 | 2.52% | 1.00 |
| 7 | 1000 | 1200 | 0.56% | 1.00 | 1000 | 1200 | 2.02% | 1.00 | 1000 | 1200 | 2.52% | 1.00 |
| 8 | 1000 | 1300 | 0.56% | 1.00 | 1000 | 1300 | 2.10% | 1.00 | 1000 | 1300 | 2.52% | 1.00 |
| 9 | 1000 | 700 | 0.56% | 1.00 | 1000 | 700 | 2.02% | 1.00 | 1000 | 700 | 2.52% | 1.00 |
| 10 | 1000 | 900 | 0.56% | 1.00 | 1000 | 900 | 2.02% | 1.00 | 1000 | 900 | 2.52% | 1.00 |
| 11 | 1000 | 800 | 0.56% | 1.00 | 1000 | 800 | 2.02% | 1.00 | 1000 | 800 | 2.52% | 1.00 |
| 12 | 1000 | 1100 | 0.56% | 1.00 | 1000 | 1100 | 2.02% | 1.00 | 1000 | 1100 | 2.52% | 1.00 |
| 13 | 1000 | 1200 | 0.56% | 1.00 | 1000 | 1200 | 2.02% | 1.00 | 1000 | 1200 | 2.52% | 1.00 |
| 14 | 1000 | 1300 | 0.56% | 1.00 | 1000 | 1300 | 2.10% | 1.00 | 1000 | 1300 | 2.52% | 1.00 |
| 15 | 1000 | 700 | 0.56% | 1.00 | 1000 | 700 | 2.02% | 1.00 | 1000 | 700 | 2.52% | 1.00 |
| 16 | 1000 | 900 | 0.56% | 1.00 | 1000 | 900 | 2.02% | 1.00 | 1000 | 900 | 2.52% | 1.00 |
| 17 | 1000 | 800 | 0.56% | 1.00 | 1000 | 800 | 2.02% | 1.00 | 1000 | 800 | 2.52% | 1.00 |
| 18 | 1000 | 1100 | 0.56% | 1.00 | 1000 | 1100 | 2.02% | 1.00 | 1000 | 1100 | 2.52% | 1.00 |
| 19 | 1000 | 1200 | 0.56% | 1.00 | 1000 | 1200 | 2.02% | 1.00 | 1000 | 1200 | 2.52% | 1.00 |
| 20 | 1000 | 1300 | 0.56% | 1.00 | 1000 | 1300 | 2.10% | 1.00 | 1000 | 1300 | 2.52% | 1.00 |
| 21 | 1000 | 700 | 0.56% | 1.00 | 1000 | 700 | 2.02% | 1.00 | 1000 | 700 | 2.52% | 1.00 |
| 22 | 1000 | 900 | 0.56% | 1.00 | 1000 | 900 | 2.02% | 1.00 | 1000 | 900 | 2.52% | 1.00 |
| 23 | 1000 | 800 | 0.56% | 1.00 | 1000 | 800 | 2.02% | 1.00 | 1000 | 800 | 2.52% | 1.00 |
| 24 | 1000 | 1100 | 0.56% | 1.00 | 1000 | 1100 | 2.02% | 1.00 | 1000 | 1100 | 2.52% | 1.00 |
| 25 | 1000 | 1200 | 0.56% | 1.00 | 1000 | 1200 | 2.02% | 1.00 | 1000 | 1200 | 2.52% | 1.00 |
| 26 | 1000 | 1300 | 0.56% | 1.00 | 1000 | 1300 | 2.10% | 1.00 | 1000 | 1300 | 2.52% | 1.00 |
| 27 | 1000 | 700 | 0.56% | 1.00 | 1000 | 700 | 2.02% | 1.00 | 1000 | 700 | 2.52% | 1.00 |
| 28 | 1000 | 900 | 0.56% | 1.00 | 1000 | 900 | 2.02% | 1.00 | 1000 | 900 | 2.52% | 1.00 |
| 29 | 1000 | 800 | 0.56% | 1.00 | 1000 | 800 | 2.02% | 1.00 | 1000 | 800 | 2.52% | 1.00 |
| 30 | 1000 | 1100 | 0.56% | 1.00 | 1000 | 1100 | 2.02% | 1.00 | 1000 | 1100 | 2.52% | 1.00 |
| 31 | 1000 | 1200 | 0.56% | 1.00 | 1000 | 1200 | 2.02% | 1.00 | 1000 | 1200 | 2.52% | 1.00 |
| 32 | 1000 | 1300 | 0.56% | 1.00 | 1000 | 1300 | 2.10% | 1.00 | 1000 | 1300 | 2.52% | 1.00 |
| 33 | 1000 | 700 | 0.56% | 1.00 | 1000 | 700 | 2.02% | 1.00 | 1000 | 700 | 2.52% | 1.00 |
| 34 | 1000 | 900 | 0.56% | 1.00 | 1000 | 900 | 2.02% | 1.00 | 1000 | 900 | 2.52% | 1.00 |
| 35 | 1000 | 800 | 0.56% | 1.00 | 1000 | 800 | 2.02% | 1.00 | 1000 | 800 | 2.52% | 1.00 |
| 36 | 1000 | 1100 | 0.56% | 1.00 | 1000 | 1100 | 2.02% | 1.00 | 1000 | 1100 | 2.52% | 1.00 |
| 37 | 1000 | 1200 | 0.56% | 1.00 | 1000 | 1200 | 2.02% | 1.00 | 1000 | 1200 | 2.52% | 1.00 |
| 38 | 1000 | 1300 | 0.56% | 1.00 | 1000 | 1300 | 2.10% | 1.00 | 1000 | 1300 | 2.52% | 1.00 |
| 39 | 1000 | 700 | 0.56% | 1.00 | 1000 | 700 | 2.02% | 1.00 | 1000 | 700 | 2.52% | 1.00 |
| 40 | 1000 | 900 | 0.56% | 1.00 | 1000 | 900 | 2.02% | 1.00 | 1000 | 900 | 2.52% | 1.00 |
| Total | 177000 | 256900 | 119.25% | | 49467.675 | 61895.63 | 115.65% | | 39756.5 | 42865.93 | 100.00% | |

Figure 8 - Product Categorization

A standardized taxonomy system may take many forms. The following is indented outline representation of a portion of such a system. To the right is a corresponding tree diagram showing the levels of the taxonomy hierarchy.

- Sporting Goods
  - Camping & Outdoors
    - ATVs & Motorcycles
    - Auto Accessories
    - Backpacks
    - Camping/Hiking
    - Hunting & Fishing
    - Knives
    - Optics
  - Collectibles
    - Bobbleheads
    - Coins & Stamps
    - Diecasts & Replicas

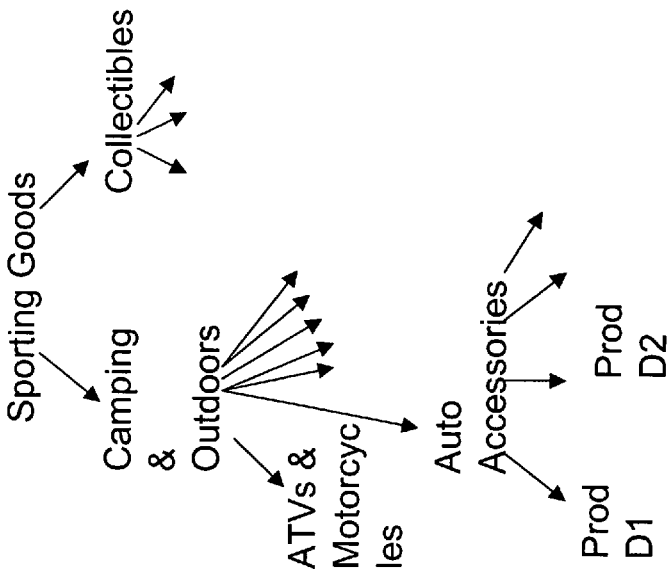

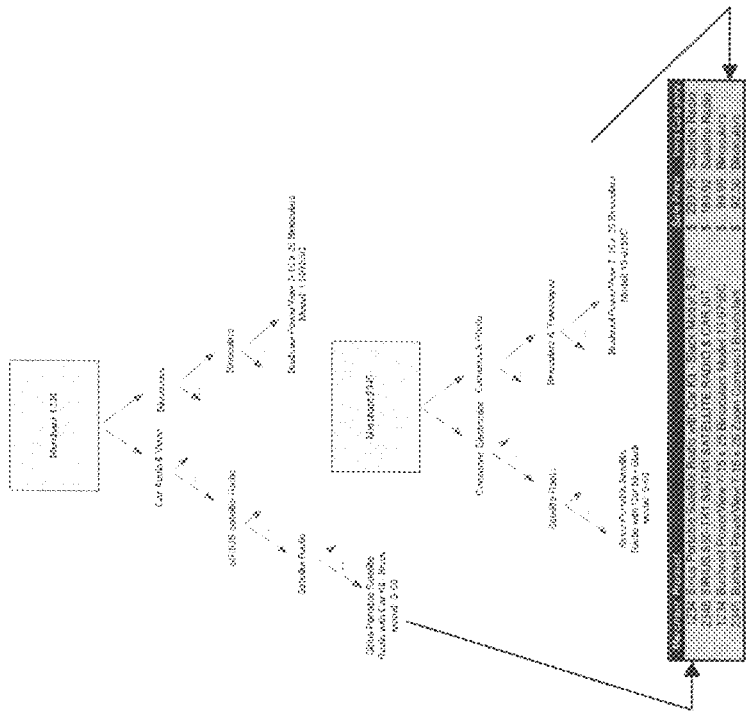

Figure 10a – Profile Vector Creation

| Sporting Goods | | 100% |
|---|---|---|
| | Camping & Outdoors | 8.0% |
| | ATVs & Motorcycles | 4.0% |
| | Auto Accessories | 1.0% |
| | Backpacks | 0.5% |
| | Camping/Hiking | 0.5% |
| | Hunting & Fishing | 1.0% |
| | Knives | 0.5% |
| | Optics | 0.5% |
| | Collectibles | 4.0% |
| | Bobbleheads | 0.1% |
| | Coins & Stamps | 0.1% |
| | Diecasts & Replicas | 0.1% |
| | Fan Shop | 0.1% |
| | Other Collectibles | 0.1% |
| | Sports Memorabilia | 2.8% |
| | Sports Plaques | 0.5% |
| | Swords & Collectible Knives | 0.1% |
| | Trading Cards | 0.1% |
| | Golf Equipment | 12.8% |
| | Club Sets | 7.9% |
| | Golf Apparel | 2.0% |
| | Golf Bags | 1.0% |
| | Golf Balls | 0.5% |
| | Golf Gear | 0.5% |
| | Golf Shoes | 0.5% |
| | Single Golf Clubs | 0.4% |
| | Hobbies & Toys | 2.0% |
| | Arts & Crafts | 1.4% |
| | Dolls & Dollhouses | 0.1% |
| | Electronic Toys | 0.1% |
| | Indoor Toys | 0.1% |
| | Musical Instruments | 0.1% |
| | Outdoor Toys | 0.1% |
| | Stuffed Toys | 0.1% |
| | Parlor Games | 21.9% |
| | Billiards | 4.8% |
| | Board Games | 3.0% |
| | Casino Games | 4.0% |
| | Game Tables | 5.1% |
| | Poker | 5.0% |
| | Snow Sports | 12.0% |
| | Goggles & Helmets | 3.0% |
| | Ski & Snowboard Racks | 2.0% |
| | Skiing | 1.0% |
| | Snow Apparel | 3.0% |
| | Snowboarding | 3.0% |
| | Sports & Fitness | 39.1% |
| | Cycling | 4.9% |
| | Fitness/Exercise | 6.0% |
| | Home Gym Machines | 4.9% |
| | Paintball | 4.9% |
| | Racquet Sports | 4.8% |
| | Skating & Scooters | 4.9% |
| | Sports Therapy | 5.5% |
| | Water Sports | 3.2% |

| Iteration One | |
|---|---|
| Category | Percentage |
| Club Sets | 7.9% |
| Fitness/Exercise | 8.0% |
| Sports Therapy | 5.5% |
| Game Tables | 5.1% |
| Poker | 5.0% |

| Iteration Two | |
|---|---|
| Category | Percentage |
| Sports & Fitness | 27.60% |
| Snow Sports | 12.0% |
| Parlor Games | 11.6% |
| Camping & Outdoors | 8.0% |
| Club Sets | 7.9% |
| Fitness/Exercise | 6.0% |
| Sports Therapy | 5.5% |
| Game Tables | 5.1% |
| Poker | 5.0% |

| Iteration Three | |
|---|---|
| Category | Percentage |
| Sports & Fitness | 27.60% |
| Snow Sports | 12.00% |
| Parlor Games | 11.8% |
| Sporting Goods | 11.1% |
| Camping & Outdoors | 8.00% |
| Club Sets | 7.90% |
| Fitness/Exercise | 6.00% |
| Sports Therapy | 5.50% |
| Game Tables | 5.10% |
| Poker | 5.0% |

- A merchant specific "vector" is constructed based on products actually sold product
  - Merchant vector is based on the category distribution of sales over a defined window of time
  - Merchant may have multiple different vectors over a different period of time
- A given merchant has categories based on 5% threshold for a category being a dominant sales
- We calculate the percentage of sales for all category nodes and sub-nodes.
  - Start by traversing the deepest tree node
  - If the present node accounts for more than 5% of total sales then we add that node to a sorted attribute list and remove same percentage from all parent nodes. After traversing all sub-nodes in the current node we move to n-1 level and repeat the process until we have reached the top level.
- At this point we now have merchants' sales category vector.
  - Elements of the merchant's category vector are highlighted
- For improved clarity, the word "other" may be pre-pended to category nodes where subcategory nodes met the materiality requirements to be displayed in the feature vector

Fig 10b - Profile Vector Creation for Investments

- A profile vector can be constructed to permit an investor to identify quickly the most material aspects of their investment portfolio, no matter how many investments or categories comprise the portfolio.
- The method for profile vector creation is the same as in Fig 10, except for the word 'Other' is prepended to category nodes where subcategory nodes met the materiality requirements to be displayed in the feature vector. For instance, both Small Cap Growth Stocks and the parent "Other Small Cap Stocks" were material.

| Investments | | | |
|---|---|---|---|
| Stocks | 100.0% | | |
| | | IBM | 8.0% |
| | | GE | 4.8% |
| | | Intel | 6.0% |
| | | Nasdaq 100 | 4.2% |
| | | Amazon.com | 2.0% |
| | | eBay | 3.0% |
| | | Western Refining | 3.0% |
| Mutual Funds | 35.0% | | |
| | | International Mutual Funds | 3.0% |
| | | U.S. Equities Mutual Funds | 2.0% |
| | | Japan Mutual Funds | 4.0% |
| | | United Kingdom Mutual Fund | 4.0% |
| | | South Korea Mutual Funds | 2.0% |
| | | Semiconductors Mutual Funds | 4.9% |
| | | Russia Mutual Funds | 4.1% |
| | | Technology Mutual Funds | 6.0% |
| | | Healthcare Mutual Funds | 5.0% |
| Bonds | 14.9% | | |
| | | Municipal Bonds | 7.9% |
| | | Corporate Bonds | 2.0% |
| | | U.S. Treasury Bonds | 3.0% |
| | | Foreign Bonds | 2.0% |
| Stocks | 19.1% | | |
| | | Large Cap Stocks | 5.0% |
| | | Medium Cap Stocks | 3.0% |
| | | Small Cap Stocks | 11.1% |
| | | Preferred Stock (Small Cap Stocks) | 2.0% |
| | | Balanced (Small Cap Stocks) | 2.0% |
| | | Value (Small Cap Stocks) | 2.0% |
| | | Growth (Small Cap Stocks) | 5.1% |

Iteration One

| Category | Percentage |
|---|---|
| Growth (Small Cap Stocks) | 5.1% |

Iteration Two

| Category | Percentage |
|---|---|
| IBM | 8.0% |
| Municipal Bonds | 7.9% |
| Other Small Cap Stocks | 6.1% |
| Technology Mutual Funds | 6.0% |
| Intel | 6.0% |
| Growth (Small Cap Stocks) | 5.1% |
| Large Cap Stocks | 5.0% |

Iteration Three

| Category | Percentage |
|---|---|
| Other Mutual Funds | 24.0% |
| Other Stocks | 17.0% |
| IBM | 8.0% |
| Municipal Bonds | 7.9% |
| Other Bonds | 7.0% |
| Other Small Cap Stocks | 6.0% |
| Technology Mutual Funds | 6.0% |
| Intel | 6.0% |
| Growth (Small Cap Stocks) | 5.1% |
| Large Cap Stocks | 5.0% |

Fig 10c – Profile Vector Creation for Accounting

- A profile vector can be constructed to permit an accountant or manager to identify quickly the most material aspects of their financials, no matter how many categories comprise the financial reports.
- The method for profile vector creation is the same as in Fig 10, except for the word 'Other' is prepended to category nodes where subcategory nodes met the materiality requirements to be displayed in the feature vector. For instance, both "Excessive Spending Sales Team Event" and the parent "Other Entertainment" were material expenses.

| Expense | | | |
|---|---|---|---|
| | 100.0% | | |
| Advertising | | 31.0% | |
| | Television | | 8.0% |
| | Radio | | 4.8% |
| | Magazine | | 6.0% |
| | Direct Mail | | 4.2% |
| | Paid Search | | 2.0% |
| | Search Engine Optimization | | 3.0% |
| | Newspaper | | 3.0% |
| Office Expenses | | 35.0% | |
| | Alarm System | | 3.0% |
| | Building Modifications | | 2.0% |
| | Electricity | | 4.0% |
| | Janitorial | | 4.0% |
| | Mail Box Rental | | 2.0% |
| | Postage | | 4.9% |
| | Propane/Heating | | 4.1% |
| | Storage | | 6.0% |
| | Waste Removal | | 5.0% |
| Legal & Professional Fe | | 14.9% | |
| | Accounting Fees | | 7.9% |
| | Web Development | | 2.0% |
| | Legal | | 3.0% |
| | Consulting Fees | | 2.0% |
| Travel & Entertainmen | | 19.1% | |
| | Travel | | 5.0% |
| | Meals | | 3.0% |
| | Entertainment | | 11.1% |
| | Engineering Team Expenses | | 2.0% |
| | Fitness Club | | 2.0% |
| | Corporate Planning Mtg | | 2.0% |
| | Excessive Spending Sales Team Event | | 5.1% |

Iteration One

| Category | Percentage |
|---|---|
| Excessive Spending Sales Team Event | 5.1% |

Iteration Two

| Category | Percentage |
|---|---|
| Television | 8.0% |
| Accounting Fees | 7.9% |
| Other Entertainment | 6.1% |
| Storage | 6.0% |
| Magazine | 6.0% |
| Excessive Spending Sales Team Event | 5.1% |
| Travel | 5.0% |

Iteration Three

| Category | Percentage |
|---|---|
| Other Office Expenses | 24.0% |
| Other Advertising | 17.0% |
| Television | 8.0% |
| Accounting Fees | 7.9% |
| Other Legal & Professional Fees | 7.0% |
| Other Entertainment | 6.0% |
| Storage | 6.0% |
| Magazine | 6.0% |
| Excessive Spending Sales Team Event | 5.1% |
| Travel | 5.0% |

Figure 11 - Profile Vector Creation

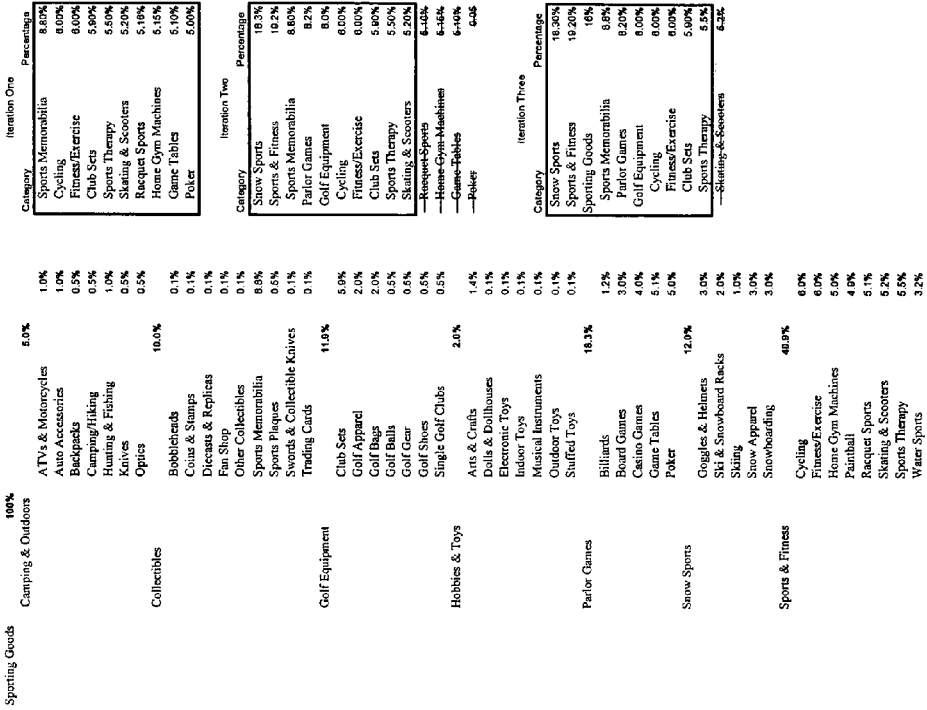

- After traversing all sub-nodes in the current node we move to n-1 level and repeat the process until we have reached the top level.
  - After each iteration categories are removed from the merchant vector if the total percentage of sales from the current level exceed the previous level
  - If a sub-category is removed from the merchant vector it needs to be added back the parent category (i.e., Poker and Parlor Games)
- At this point we now have merchants' sales category vector.
  - Elements of the merchant's category vector are highlighted

Figure 12 - Category Sales Growth Comparison

- Compares the sales growth of the current merchant to the aggregate performance of merchants selling in one selected category and the market as a whole
- Query: "How did my sales growth (in a particular category) over a given period compare with the sales growth of all merchants in that category and the overall marketplace?"

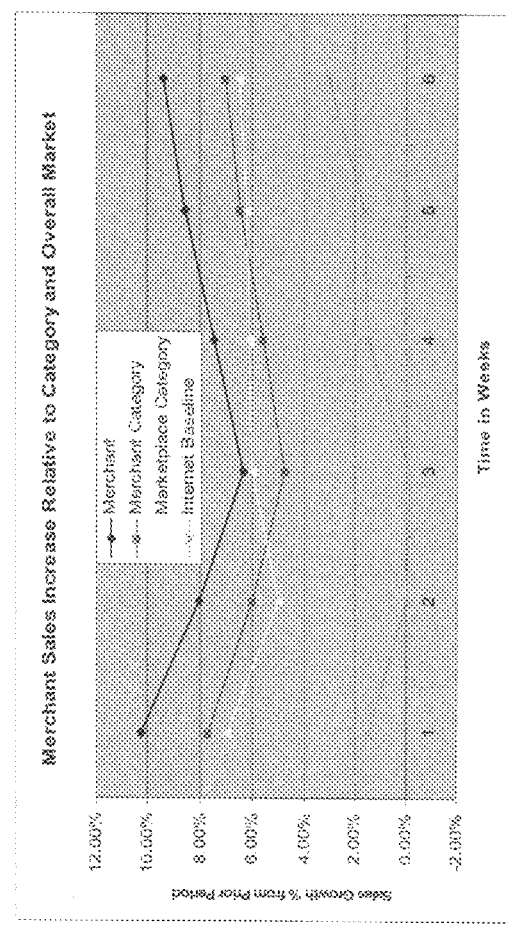

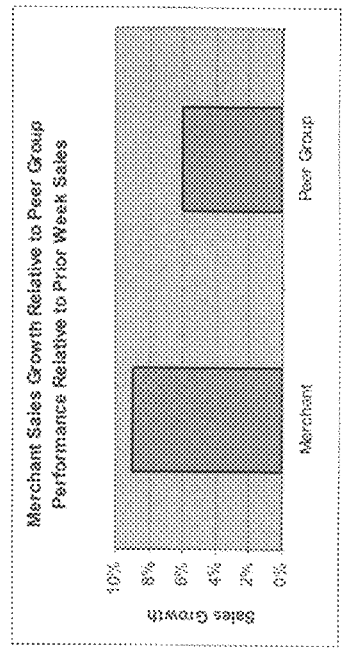
Figure 13 - Merchant Sales Growth Relative to Category

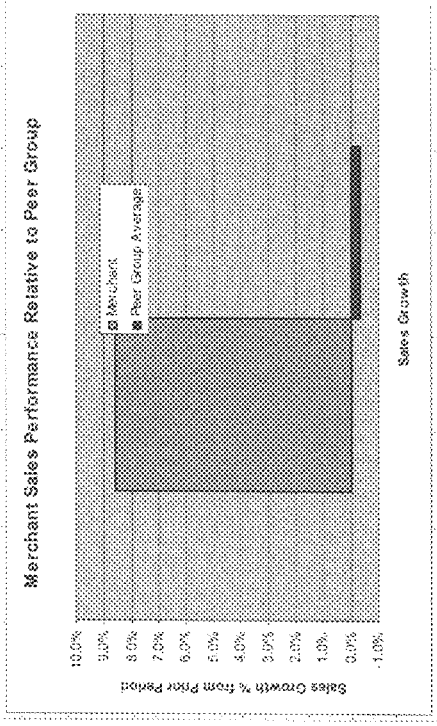
Figure 14 - Merchant Sales Growth Relative to Peers Comparison

Figure 15 – Pricing Data Product 1234

| Merchant | Channel 1 | Channel 2 | Channel 3 | Channel 4 | Channel 4 |
|---|---|---|---|---|---|
| 1 | $99.95 | $89.95 | $95.95 | $99.95 | $87.95 |
| 2 | $97.95 | $89.95 | $93.95 | $95.95 | $87.95 |
| 3 | $95.95 | $87.95 | $91.95 | $99.95 | $86.95 |
| ... | | | | | |
| N | $ | $ | $ | $ | $ |
| Min | $ | $ | $ | $ | $ |
| Max | $ | $ | $ | $ | $ |
| Mean | $98.00 | $88.54 | $93.03 | $96.50 | $87.45 |
| StdDev | $1.00 | $0.50 | $4.00 | $1.05 | $0.45 |
| Subject Merchant | $102.00 | $88.00 | $79.00 | $97.00 | $95.00 |

| | |
|---|---|
| Merchant Above Market | |
| Merchant Below Market | |

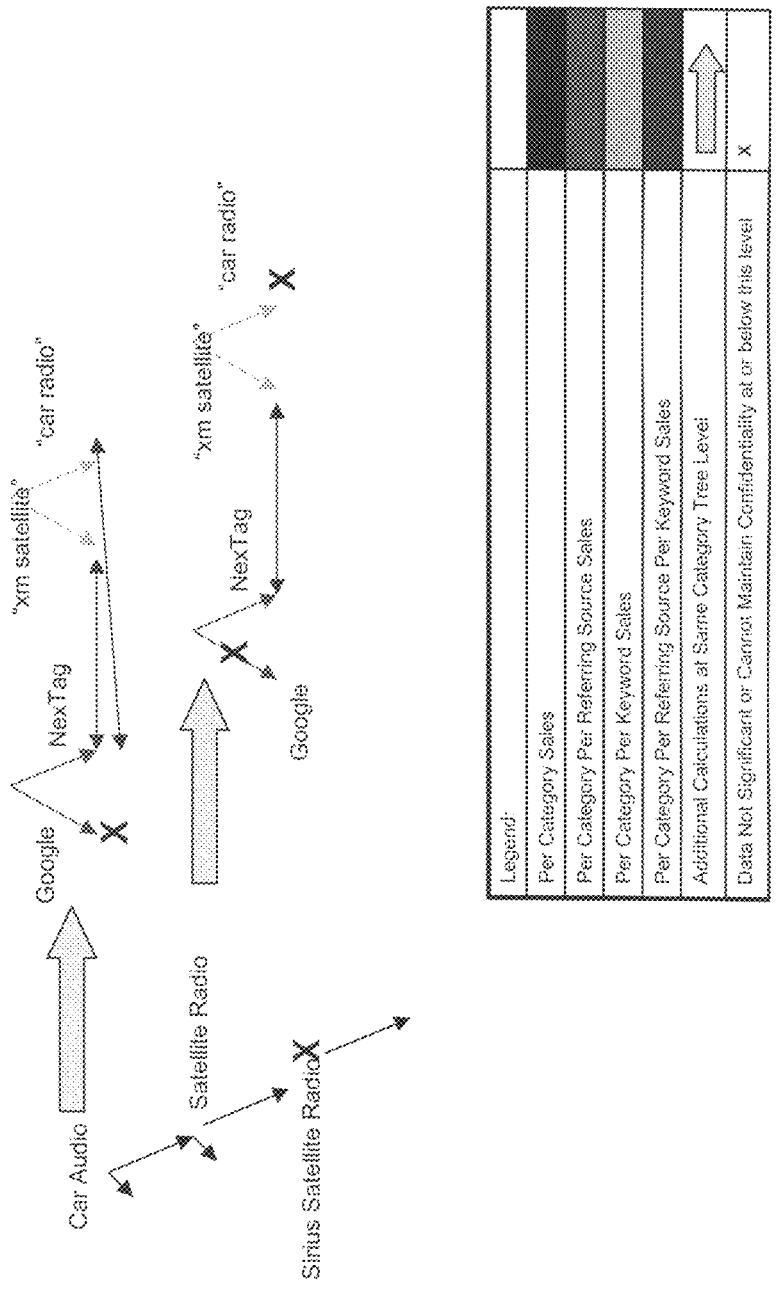
Figure 16 - Calculation of Sales Per Category Per Referring Source and Per Keyword

FIGURE 17

Example of calculations with possible dampening for sales results by referring source for a given category over a specified period Assume that the system already calculated results for a single category (e.g. 'Car Audio') and that there was enough data to meet statistical significance and merchant confidentiality requirements Next, the system may calculate sales performance for specific referring sources (e.g. NexTag) within that category.

In this instance, the # of sales, $ of sales, and Average Order Size are calculated for that category for that referring source and for a given time period.

| | Initial | | | | Round2 | | | | Round3 | | | |
|---|---|---|---|---|---|---|---|---|---|---|---|---|
| Merchant | # Sales | $ Sales | % | adjustment ratio | # Sales | $ Sales | % | adjustment ratio | # Sales | $ Sales | % | adjustment ratio |
| 1 | 100 | 10000 | 13.53% | 0.28 | 27.7125 | 2771.25 | 6.28% | 0.60 | 16.5571875 | 1655.719 | 4.04% | 1.00 |
| 2 | 500 | 12000 | 17.24% | 0.22 | 108.75 | 2610 | 5.91% | 0.63 | 68.98828125 | 1655.719 | 4.04% | 1.00 |
| 3 | 500 | 15000 | 20.30% | 0.18 | 92.375 | 2771.25 | 6.28% | 0.60 | 55.190625 | 1655.719 | 4.04% | 1.00 |
| 4 | 0 | 0 | 1.22% | 0.00 | 0 | 0 | 0.00% | 0.00 | 0 | 0 | 0.00% | 0.00 |
| 5 | 50 | 800 | 1.72% | 1.00 | 50 | 800 | 2.46% | 1.00 | 50 | 800 | 2.58% | 1.00 |
| 6 | 50 | 1100 | 1.72% | 1.00 | 50 | 1100 | 2.49% | 1.00 | 50 | 1100 | 2.69% | 1.00 |
| 7 | 50 | 1200 | 1.72% | 1.00 | 50 | 1200 | 2.72% | 1.00 | 50 | 1200 | 2.93% | 1.00 |
| 8 | 50 | 1300 | 1.76% | 1.00 | 50 | 1300 | 2.94% | 1.00 | 50 | 1300 | 3.17% | 1.00 |
| 9 | 50 | 700 | 1.72% | 1.00 | 50 | 700 | 2.46% | 1.00 | 50 | 700 | 2.58% | 1.00 |
| 10 | 50 | 900 | 1.72% | 1.00 | 50 | 900 | 2.46% | 1.00 | 50 | 900 | 2.58% | 1.00 |
| 11 | 50 | 800 | 1.72% | 1.00 | 50 | 800 | 2.46% | 1.00 | 50 | 800 | 2.58% | 1.00 |
| 12 | 50 | 1100 | 1.72% | 1.00 | 50 | 1100 | 2.49% | 1.00 | 50 | 1100 | 2.69% | 1.00 |
| 13 | 50 | 1200 | 1.72% | 1.00 | 50 | 1200 | 2.72% | 1.00 | 50 | 1200 | 2.93% | 1.00 |
| 14 | 50 | 1300 | 1.76% | 1.00 | 50 | 1300 | 2.94% | 1.00 | 50 | 1300 | 3.17% | 1.00 |
| 15 | 50 | 700 | 1.72% | 1.00 | 50 | 700 | 2.46% | 1.00 | 50 | 700 | 2.58% | 1.00 |
| 16 | 50 | 900 | 1.72% | 1.00 | 50 | 900 | 2.46% | 1.00 | 50 | 900 | 2.58% | 1.00 |
| 17 | 50 | 800 | 1.72% | 1.00 | 50 | 800 | 2.46% | 1.00 | 50 | 800 | 2.58% | 1.00 |
| 18 | 50 | 1100 | 1.72% | 1.00 | 50 | 1100 | 2.49% | 1.00 | 50 | 1100 | 2.69% | 1.00 |
| 19 | 50 | 1200 | 1.72% | 1.00 | 50 | 1200 | 2.72% | 1.00 | 50 | 1200 | 2.93% | 1.00 |
| 20 | 50 | 1300 | 1.76% | 1.00 | 50 | 1300 | 2.94% | 1.00 | 50 | 1300 | 3.17% | 1.00 |
| 21 | 50 | 700 | 1.72% | 1.00 | 50 | 700 | 2.46% | 1.00 | 50 | 700 | 2.58% | 1.00 |
| 22 | 50 | 900 | 1.72% | 1.00 | 50 | 900 | 2.46% | 1.00 | 50 | 900 | 2.58% | 1.00 |
| 23 | 50 | 800 | 1.72% | 1.00 | 50 | 800 | 2.46% | 1.00 | 50 | 800 | 2.58% | 1.00 |
| 24 | 50 | 1100 | 1.72% | 1.00 | 50 | 1100 | 2.49% | 1.00 | 50 | 1100 | 2.69% | 1.00 |
| 25 | 50 | 1200 | 1.72% | 1.00 | 50 | 1200 | 2.72% | 1.00 | 50 | 1200 | 2.93% | 1.00 |
| 26 | 50 | 1300 | 1.76% | 1.00 | 50 | 1300 | 2.94% | 1.00 | 50 | 1300 | 3.17% | 1.00 |
| 27 | 50 | 700 | 1.72% | 1.00 | 50 | 700 | 2.46% | 1.00 | 50 | 700 | 2.58% | 1.00 |
| 28 | 50 | 900 | 1.72% | 1.00 | 50 | 900 | 2.46% | 1.00 | 50 | 900 | 2.58% | 1.00 |
| 29 | 50 | 800 | 1.72% | 1.00 | 50 | 800 | 2.46% | 1.00 | 50 | 800 | 2.58% | 1.00 |
| 30 | 50 | 1100 | 1.72% | 1.00 | 50 | 1100 | 2.49% | 1.00 | 50 | 1100 | 2.69% | 1.00 |
| 31 | 50 | 1200 | 1.72% | 1.00 | 50 | 1200 | 2.72% | 1.00 | 50 | 1200 | 2.93% | 1.00 |
| 32 | 50 | 1300 | 1.76% | 1.00 | 50 | 1300 | 2.94% | 1.00 | 50 | 1300 | 3.17% | 1.00 |
| 33 | 50 | 700 | 1.72% | 1.00 | 50 | 700 | 2.46% | 1.00 | 50 | 700 | 2.58% | 1.00 |
| 34 | 50 | 900 | 1.72% | 1.00 | 50 | 900 | 2.46% | 1.00 | 50 | 900 | 2.58% | 1.00 |
| 35 | 50 | 800 | 1.72% | 1.00 | 50 | 800 | 2.46% | 1.00 | 50 | 800 | 2.58% | 1.00 |
| 36 | 50 | 1100 | 1.72% | 1.00 | 50 | 1100 | 2.49% | 1.00 | 50 | 1100 | 2.69% | 1.00 |
| 37 | 50 | 1200 | 1.72% | 1.00 | 50 | 1200 | 2.72% | 1.00 | 50 | 1200 | 2.93% | 1.00 |
| 38 | 50 | 1300 | 1.76% | 1.00 | 50 | 1300 | 2.94% | 1.00 | 50 | 1300 | 3.17% | 1.00 |
| 39 | 50 | 700 | 1.72% | 1.00 | 50 | 700 | 2.46% | 1.00 | 50 | 700 | 2.58% | 1.00 |
| 40 | 50 | 900 | 1.72% | 1.00 | 50 | 900 | 2.46% | 1.00 | 50 | 900 | 2.58% | 1.00 |

Totals for Period

| No Dampening | | | # Sales | $ Sales | | | Fully Dampened | | |
|---|---|---|---|---|---|---|---|---|---|
| # Sales | $ Sales | | 2029 | $ 44,153 | 111.75% | | # Sales | $ Sales | |
| 2900 | $ 73,900 | 114.57% | | | | | 1,941 | $ 40,967 | 111.22% |
| Avg Order Size--> | $ 25.48 | | Avg Order Size--> | $ 21.76 | | | Avg Order Size--> | $ 21.11 | |

SYSTEM FOR COLLABORATIVE INTERNET COMPETITIVE SALES ANALYSIS

FIELD OF THE INVENTION

The present invention relates to a method for developing Internet sales analysis reports from activity messages initiated by web site usage. More particularly, the method facilitates developing analytic reports that provide insight into the sales performance of a given Internet merchant's product offerings relative to other merchants selling similar products who collaborate in data collection. The method also supports inferences on aggregate sales performance information for the Internet in general.

BACKGROUND OF THE INVENTION

Access to real time sales and competitive information enables merchants to make informed decisions on product positioning and/or price that will optimize their businesses' performance. Today, merchants typically utilize tools that provide incomplete information on a merchant's own sales performance and little or no information on how the merchant is performing against its competition. Tools that enable merchants to analyze pricing and channel sensitivity and compare their sales results with competitors on a product, category, or seasonality basis are useful to improve profitability of the merchant. Further, given the plethora of marketing approaches, such as pay-per-click advertising, direct mail, search engine optimization, free shipping promotions, e-mail newsletters, and leveraging dominant marketplaces such as Yahoo, eBay or Amazon, merchants require tools that can objectively analyze sales data and provide actionable advice to improve the merchant's sales and profitability.

Today, online merchants use a variety of tools to track their business performance, including accounting systems (e.g., QuickBooks), web traffic reporting software (e.g., Google Analytics, WebSideStory, WebTrends, and DeepMetrix LiveStats), pay-per-click keyword performance (e.g. Google Adwords and Yahoo Overture), as well as reports from their eCommerce shopping cart software (e.g., osCommerce, VP-ASP, StoreFront.net). In addition, if a merchant uses a marketplace such as eBay, it can use the reporting tools for that marketplace.

Larger merchants can use sales analytics and customer profile services (e.g., CoreMetrics, WebSideStory HBX, WebTrends Enterprises, and Omniture). However, only CoreMetrics provides competitive analytics, but in a manner limited to comparing a merchant's results against others at a very high product category level such as General Merchandise or Apparel. If a merchant sells specialty items (e.g., pest control mole chasers) or if a merchant has a large amount of sales in multiple product categories (such as Food, Home Furnishings, Sporting Goods and also Apparel), the competitive analytics provided by this application may not provide sufficient detail for a meaningful comparison against a merchant's competitors. CoreMetrics also does not permit a merchant to compare how it performs against its peer group on a per channel (e.g., NexTag, Shop.com, Froogle), per product, or per category basis. None of the other known web analytics offerings provides competitive sales analytics. Also, most require significant setup and are too expensive for many small-to-medium businesses (SMBs). For SMBs, Google Analytics is free, easy to configure, and provides basic sales reporting functions. However, Google Analytics also lacks the ability to provide competitive analysis or overall e-commerce market research and is presently only available to merchants invited by Google to utilize this service.

Other sources of market research and competitive analysis exist, such as ComScore, Compete, eBay Marketplace Research, and Shopzilla AccuRate service, each with limitations. ComScore (and similarly, Compete) provides a consultancy offering where the company can produce a custom report of a merchant vs. its competitors based on ComScore's network of 2 million consumers that agreed to permit ComScore to track their shopping patterns. This service does not yield an interactive, configurable application that permits a merchant to "drill-down" into how the merchant competes against other vendors on a per-category or per-channel basis. ComScore's research services may be too expensive for a small merchant, and ComScore's user base, while possibly large enough to produce statistically significant results for very large e-commerce merchants, may not provide sufficient coverage of an SMB's sales patterns to produce a comprehensive comparison report with actionable recommendations for the merchant.

Shopzilla also advertises a 'Buyer Satisfaction Service' that allows a merchant to compare its customers' online buying experiences via "point of sale" and "fulfillment" surveys against category benchmarks. This solution is primarily focused on customer surveys, but Shopzilla does mention an "AccuRate" tool to "run trends and statistical analysis with historical data" for "competitive benchmarking, trending, filters, cross tabulations, and comment retrieval." Shopzilla also promotes "Analyst Services" where an "assigned research analyst to manage your account. Analyst will provide ad-hoc analysis, recommendations, identify data trends, propose additional survey customization, etc." It is unknown if Shopzilla's AccuRate product and related services are truly available, as a search on Google for "Shopzilla and AccuRate" returns no relevant results and a recent inquiry from a large e-commerce store went unanswered. It appears that Shopzilla is primarily focused on trends of customer satisfaction instead of trends of actual sales volume. However, Shopzilla's research fundamentally is limited in at least three respects:

a) Neither Shopzilla nor any other existing solution provides the merchant with a customized sales profile based on per product category sales analyses that directly enable the merchant (or the solution) to compare the merchant's results with other vendors on a per product category and per channel basis;

b) Shopzilla can only analyze that segment of a merchant's product offerings that is submitted to Shopzilla. Because Shopzilla is a comparison-shopping service requiring bidding on a pay per click basis for products to be listed on Shopzilla's site, many merchants may submit only products that are top sellers or produce high profit margins.

c) Shopzilla cannot provide merchants with information about how their products perform in markets other than Shopzilla.

Market research reports such as those provided by eBay require the merchant to find a combination of keywords and categories to see actual sales results. If the merchant cannot guess the 'correct' keyword data, it may not see any results. For instance, a search done May 31, 2006 on "molechasers" for eBay's MarketPlace Research returned no results, while a search on "mole chaser" returned the data in the table below.

71 items for "mole chaser" in All Categories
Auction and Fixed Price Metrics
Avg. Sold Price $18.41
Sold Price Range $5.99-$35.10

Avg. Sold Buy It Now Price $16.79
Sold Buy It Now Price Range $7.99-$29.99
Avg. Start Price $18.67
Start Price Range $5.99-$28.30
Avg. Shipping Cost $7.74
Shipping Cost Range $5.75-$10.99
Last Sold Price $29.99
Last Sold Date and Time May-30 08:13 PDT
Completed Items 60
Sold Items 35
Avg. Bids per Item 2.95
Store Inventory Metrics
Avg. Sold Price $36.51
Sold Price Range $24.62-$128.80
Avg. Shipping Cost $14.50
Shipping Cost Range $14.50-$14.50
Last Sold Price $27.95
Last Sold Date and Time May-30 23:10 PDT
Completed Items 11
Sold Items 11 eBay Marketplace Research does little to help the merchant know what it should search on to find comparable merchants or sales. Further, there is no concept defining the peers of a given merchant, nor is there an ability to compare one merchant's performance against other merchants. Plus, on eBay, when a user does find a keyword combination to produce good search results, the raw transaction data is available by product. Many merchants would prefer not to permit their competitors to drill down into actual individual sales made by the merchant. Finally, eBay is just one sales channel and seldom the only sales channel in which a product is sold.

While existing solutions can provide some useful competitive information for a merchant, they all have significant limitations. None provides a tool permitting an SMB merchant to compare its results on a per product or per product category basis against competitive results while considering performance in multiple sales channels. This type of analysis is critical for merchants to determine market size and how well they compete at a level where specific marketing decisions can be made.

Therefore, there is a need in the art for a method that facilitates the efficient collection and reporting of competitive market information for Internet merchants.

BRIEF SUMMARY

A method for cataloging and reporting Internet merchant data comprises: receiving at a data center a plurality of site activity messages regarding two or more seller sites; providing a standardized taxonomy schema with a node for each of two or more products; deriving from the plurality of site activity messages one or more sales metric for the two or more products; for a specific time period, aggregating the sales metric data for each of the two or more seller sites and the two or more products; and deriving a comparative report for the sales metric for the two or more seller sites, by reference to at least one of the two or more products in the standardized taxonomy schema.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

The detailed description will refer to the following drawings, wherein like numerals refer to like elements, and wherein:

FIG. 3 is a list of the types of data elements that will be captured from each page.

FIG. 4 is a listing of XML code for the content of a product envelope.

FIG. 5 is a listing of XML code for the content of a transaction envelope.

FIG. 6 is a schematic data flow diagram that shows how messages from websites are aggregated according to a standardized taxonomy to provide standardized sales results by product and by merchant site, supporting derivation of profile vectors and various competitive reports.

FIG. 7 is a spreadsheet showing how reported information may be aggregated, summarized and then edited to mask confidential information.

FIG. 8 is an example of a portion of a standardized taxonomy schema used by the system.

FIG. 9 is diagram showing how two different merchant categorization schemas can be resolved by the system.

FIG. 10a shows a method of deriving a profile vector for a merchant.

FIG. 10b shows a method of deriving a characteristic summary vector for an investment portfolio.

FIG. 10c shows a method of deriving a characteristic summary vector for accounting information.

FIG. 11 shows an alternate method of deriving a profile vector for a merchant.

FIG. 12 shows a sales growth report comparing merchant to marketplace for a product or product category.

FIG. 13 shows a comparative sales growth report focused on the product or product category elements in a merchant's profile vector.

FIG. 14 shows a sales growth report comparing a subject merchant to a peer group identified by similarity to the profile vector of the subject merchant.

FIG. 15 shows a single product, multi-channel, multi-merchant pricing report inferred from messages.

FIG. 16 is a schematic diagram showing a method for calculating sales results for a specific product category, segmented by referring source, search string or both of these.

FIG. 17 is a spreadsheet for a sales report by referring source for a specific product category over a specified period.

DETAILED DESCRIPTION OF THE INVENTION

Figure 1:
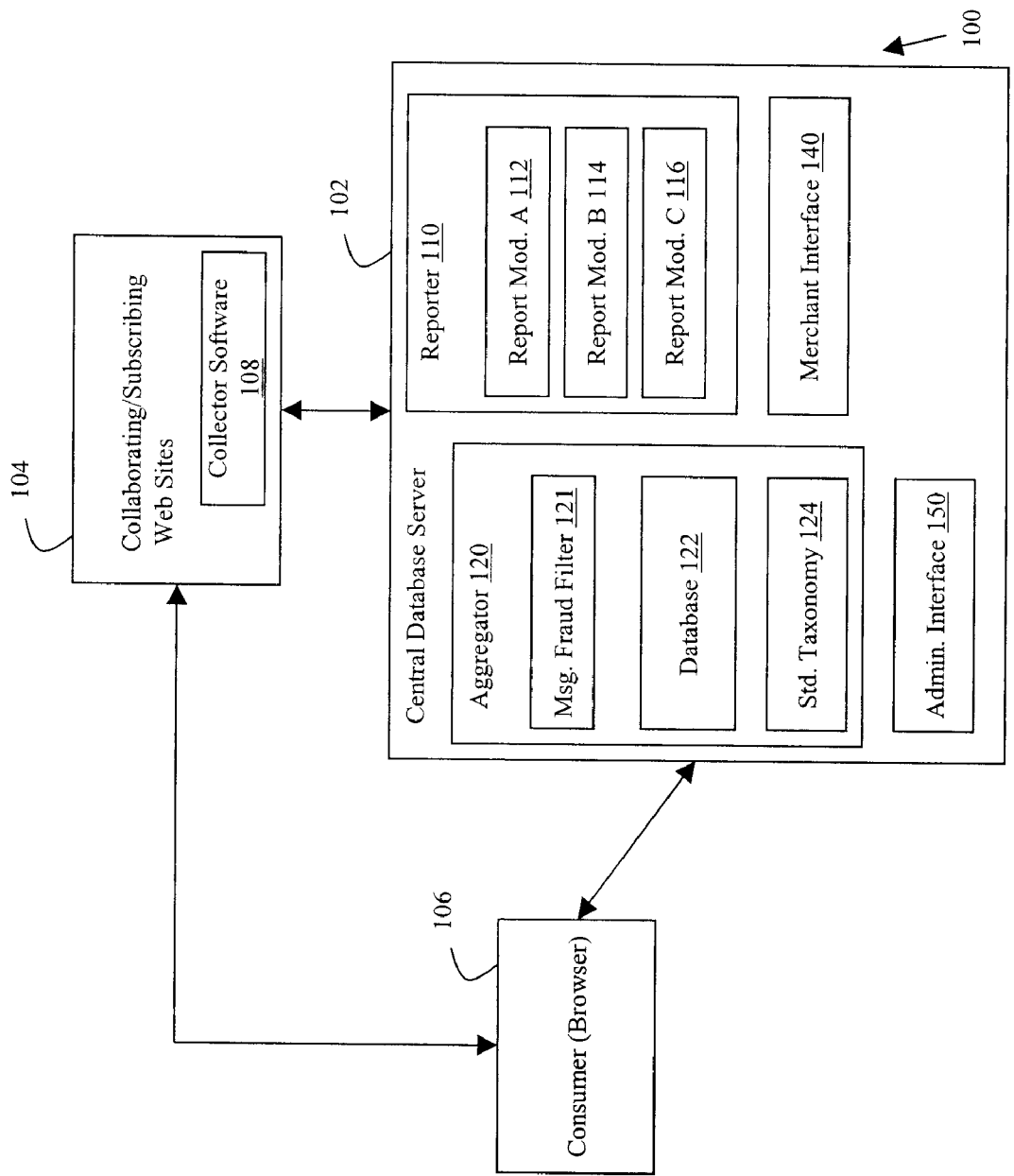
FIG. 1 is a high-level block diagram illustrating one embodiment of a system for site activity data collection and reporting.

Overview and Problem Addressed. The following describes an Internet-based service (equally applicable on private networks with similar structures) offered to merchants as well as other users that builds collections of information by observing web activity at multiple seller websites who have agreed to collaborate in a service that will benefit subscribers. In one embodiment, the Internet-based service and system offered to merchants collects information about products and product sales by "observing" HTTP web traffic originating from a group of enabled, collaborating/subscribing web sites.

As consumers browse offerings and make purchases from enabled merchant sites across the Internet, the system collects messages with data about each interaction or transaction. The system uses this information to categorize merchant offerings so that one or more peer groups can be established. The system uses the collected information to derive reports measuring purchase activity for a given site, peer group, and/or all sites in a collaborator group. Provided the system collects sufficient data, it is also able to extrapolate from the sales activity in the collaborator group to create an index/measure indicative of all commerce in some market sector of the Internet (or on overall e-commerce). In one embodiment, to ensure that some confidentiality is maintained across merchants and thereby encourage merchants to enable sales statistics to be provided to the system, the system dampens the contribution of merchants whose sale of a given item or category represents more than a specified amount, e.g., 5%, of sales in a category in the current report. The system also will not report statistics at a certain product category level or for a given product if the amount of sales data available at that product or product category level is not expected to produce statistically significant results.

Due to its collaborative, yet confidentiality protecting, nature for reporting competitive analytics, the system can produce a variety of useful reports that are largely not available by other means, including insightful data on sales activity, product category activity, product activity, and aggregate commerce activity. These include: (a) sales activity for a given site, a peer group, or all sites in a collaborator group—over time and relative to historical data; (b) product category activity of a given site relative to a peer group and all sites in a collaborator group—over time and relative to historical data, (c) product activity for a given site, a peer group, or all sites in the subscriber network—over time, relative to other products, and relative to historical data; and, (d) aggregate activity of a given site relative to a peer group and all sites in a subscriber group—over time and relative to historical data.

What is missing in all of the known systems and reporting services is the ability for a merchant to, directly, or indirectly through customers' browsers, contribute data to a market research solution that will use the data to determine market trends, provide for drill-down analysis of performance ranging from top level product categories to more detailed product category analysis and even specific product-level comparisons, while ensuring that data from each merchant does not contribute too much towards each trend identified to allow a competitor to directly identify trends or confidential position or strategies of a particular merchant.

What is also needed is a system that organizes all of the aggregated e-commerce data across merchants so as to determine profiles of different merchants, permitting both comparisons against merchants selling competitive products and market research into potential new sales areas. By determining a merchant profile based on actual sales, the merchant can quickly evaluate how it compares with competition without having to guess about which keywords or categories are most likely relevant to its business. In this manner, each merchant could collaboratively compete to improve the odds for success of all merchants in the subscriber group.

Introduction to System Components. The present system collects anonymous information about consumer behavior on commerce sites, processes and normalizes the data, then produces reports that provide insight into commerce activity on a given site, a group of related, collaborating sites, and/or all sites being monitored. As seen in FIG. 1, in an environment that includes one or more consumers 106, each using a browser to access websites, including websites in a collaborator or subscriber group 104, there are three main software-implemented parts to the data processing system 100 and service: collector components 108, and, in a central database server 102, aggregator components 120 and reporter components 110. In addition, there is an administrator interface 150 and a merchant interface 140, permitting configuration, query and other interactions with the components of central data server 102. Each of these components contributes to the success of the application; however, the focus of this initial discussion is the aggregator and reporter components 120, 110.

In one embodiment, a collector 108 comprises a small section of JavaScript code (see FIG. 2) that a given merchant site embeds somewhere on one or more (ideally all) product web pages that are served out of the merchant's e-commerce application. This code contains a finite number of specific data elements about the content of the page (see FIGS. 3, 4 and 5) and remotely transmits this information from the consumer's browser 106 to a central database server 102 for storage in a database 122 (see FIG. 1) that is in one embodiment indexed by the merchant. The database 122 may have other indexing or data structures providing efficiency for the data collection, processing and reporting tasks of the central data server 102.

To facilitate product and product category comparisons in an environment where there is no effective universal product classification system, the central database server 102 has a set of standardized taxonomy tools 124 associated with the aggregator 120. As explained below, these include a multi-level product and product category classification (in one embodiment constructed as a tree) and tools that permit navigation within the taxonomy and mapping to and from the products and product categories of merchants and those of the present system and service. FIG. 8 shows an example of a portion of a standardized taxonomy system in both the form of an indented list and the form of a tree. The portion of the taxonomy system shown in the indented list includes three levels. The highest-level product category is "Sporting Goods". The next lower level includes two or more product categories included within Sporting Goods, in this example, Camping & Outdoors and Collectibles. As can be seen in the listing in FIG. 10, which shows a larger portion of the same standardized taxonomy, there can be other sub-categories of Sporting Goods, but for simplicity of FIG. 8 the tree diagram includes only the first two subcategories shown in the indented listing of FIG. 10. The next lower level is shown by way of example as subcategories of Camping & Outdoors. Again, for simplicity the tree diagram identifies only two subcategories at this level, ATVs & Motorcycles and Auto Accessories. The five further subcategories shown in the indented listing of FIG. 8 (Backpacks, Camping/Hiking, etc.) are indicated in the tree structure by additional linking arrows without a pointed-to object.

Although for simplicity not shown in FIG. 8 in the indented list, the lowest level of a useful standardized taxonomy is one or more specific products, each forming its own node in the lowest level of the tree diagram. Thus, for example, the full standardized taxonomy would show under auto accessories specific product items, such as a Yakima Skybox Pro 18 cargo rack and Yakima Skybox Pro 16s cargo rack. In the tree diagram portion of FIG. 8, the product level is indicated in simplified form as "Prod D1", "Prod D2", and unlabeled linking arrows under Auto Accessories. A significant concept of the standardized taxonomy is the inclusion relationship between levels. That is, for reasons explained further below, for accumulating data on product sales for comparative analysis, it is useful that the ATVs & Motorcycles and Auto Accessories subcategories fit under Camping & Outdoors and that Prod D1, Prod D2, etc. fit under Auto Accessories, so that a product sale can be registered as a sale in a very specific category at the bottom of the standardized taxonomy but also accumulated as a contribution to sales at the parent, grandparent, etc. levels of the higher-level categories that include the product.

To be more effective, a standardized taxonomy schema should have enough levels to permit navigation among three or more levels; however a standardized taxonomy with only a product level, e.g., UPC code may also be useful. Also, to avoid unused or underused categories (not leading to statistically useful results), the categories at each level should be somewhat balanced, i.e., they should contain roughly comparable percentages of the products. In view of the likelihood of sales patterns changing over time as needs and fashions change, it is expected that some categories will decline in use. If this happens, the preferred remedy is navigation to a higher category where sufficient data can be found. However, a system might also contemplate remapping of certain product areas, with a possible resulting need to reprocess some historical data into the new standardized taxonomy schema.

Note that wherever "JavaScript" is used herein with reference to site activity messages, this means JavaScript or any similar technology or technologies to communicate data from the consumer's browser 106 to the central database server 102, such as an HTML image, proxy server forwarder or signed browser applet; also intended are embodiments for server-to-server communications such as a CGI application, a SOAP call, an XML message, a Web log, spreadsheet or a proprietary protocol to convey merchant traffic and transaction data from the merchant to the central database server 102; finally, a persistent browser cookie may be combined with the JavaScript technology to enable the system to track user visits in addition to page views. One or more such facilities are used to collect data about browsing and purchasing activity on merchant sites for storage in database 122.

The aggregator 120 is a component of the central database server 102 that "listens" to data points provided in site activity messages by the collaborating collectors 108, i.e., it receives, processes and stores the messages transmitted by the collector software 108. The system processes merchant site-supplied activity messages differently depending on the nature of the page that is being delivered. For example, purchase information receives more processing than information generated from browsing through a website catalog. The aggregator 120 accepts and processes information in such a way that shopper anonymity and merchant confidentiality are maintained (to varying degrees, depending on the subscriber community agreement), and fraud is deterred.

Finally, the reporter 110 is a reporting module that provides unique analytics derived from data stored by the aggregator 120, using one or more reporting tool modules, e.g., Report Modules A 112, B 114, and C 116. The reporter 110 is capable of producing product and/or product category specific, merchant specific, and general reports on product transactions captured in database 122. The following detailed description of specific implementation scenarios and use examples illustrates how this system and service can be used.

Collector and Aggregator Operation. This section is limited to discussion of merchants selling products over the Internet that have subscribed to the service, i.e., are part of a collaboration group. To enable a site, a merchant typically embeds a customized section of JavaScript into the header of each page in its e-commerce application.

Figure 2:
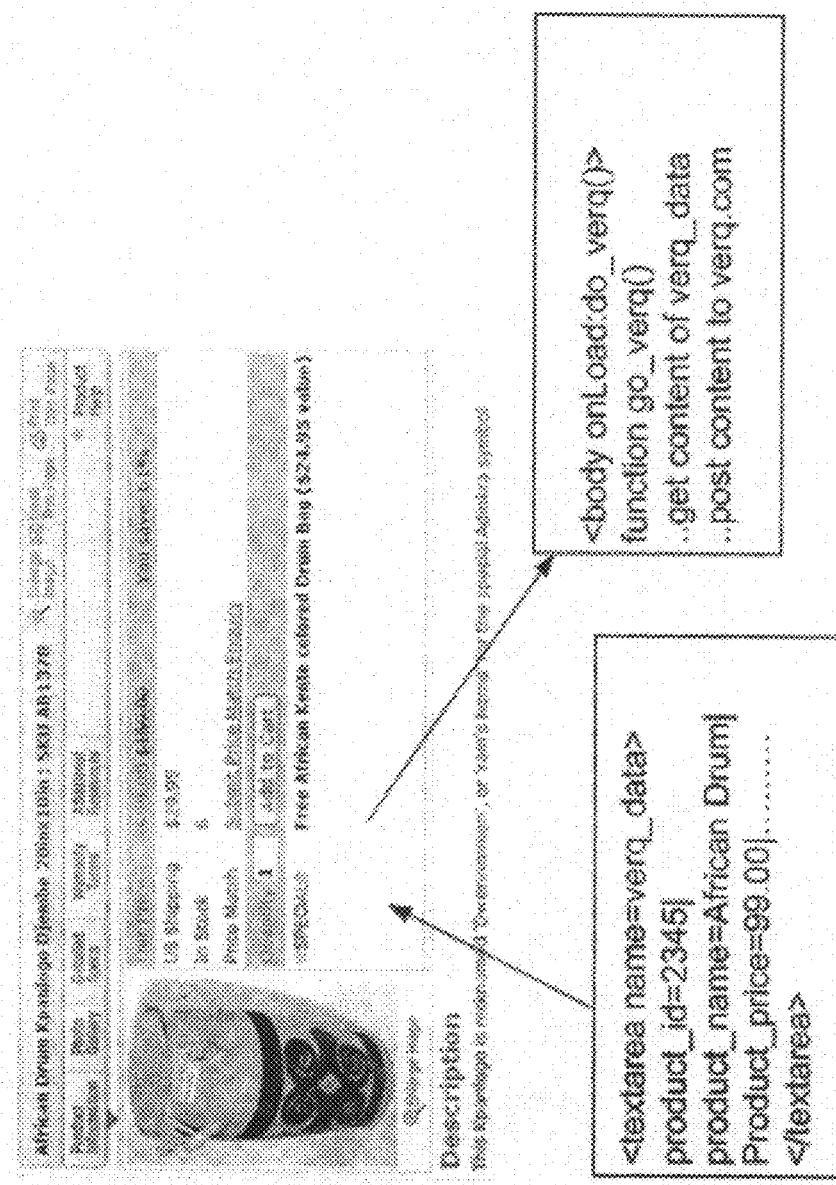
FIG. 2 is an example of the JavaScript code to be embedded in pages in the merchant's website.

Using JavaScript (or similar technologies described above), the transport mechanism for transparently passing information about the current page to the central database server 102 is typically in the form of an HTTP GET, POST or an HTTP image access. As shown in FIG. 2, each JavaScript message has a header and an envelope such as described in FIG. 3, with typically XML data as exemplified in FIGS. 4 and 5. The header contains the merchant's public key and, depending on embodiment, may contain a timestamp and/or an encrypted site-specific token. The envelope contains data about the requested page, such as that described in FIGS. 3, 4, and 5, which may be in the form of delimited text, an XML document, an Excel or OpenOffice spreadsheet, or other text or binary format.

There are two types of envelopes: product information and transaction. As shown in FIG. 4, a product information envelope is based on a single product and may contain data about the actual product, including its title, part number, manufacturer, and product category. (The content of this envelope is similar to a product activity message report as described in U.S. patent application Ser. No. 11/438,976, filed May 23, 2006, titled "Method for Dynamically Building Documents Based on Observed Internet Activity," naming as inventors, William E. Staib and Dean Scott Blodgett (hereinafter "application Ser. No. 11/438,976"), which is incorporated herein by reference.)

Some of this data, such as product description, keywords, or manufacturer, is optional, but more information enables better mapping of a merchant's data to the system's standardized taxonomy 124. Also, this additional information allows for the operator of the system to provide both the value of the present system and that of the previously mentioned application Ser. No. 11/438,976 through the same data message type. As shown in FIG. 5, a transaction envelope is based on a completed purchase of one or more products and contains data about each product purchased, as well as summary information about the transaction itself, such as order total, shipping charges, taxes, and discounts applied.

In addition to obtaining and sending the sales and traffic data in activity messages from a JavaScript adapter, the merchant might use a small or invisible image or other similar approach to convey this data to the central data collector 102. Also, data may be obtained by the service via "scraping" the merchant's web site for product data and sales information. This is especially applicable if a merchant provides information on its site about the quantity of products sold or the sales rank of its products over a specified time period. To reduce the resources required for the system (and perhaps other services) to obtain data from the merchant's site, the merchant may make its site scraper- or robot-"friendly" by inserting hidden HTML comments into the merchant's web page to direct scrapers to the merchant's product and sales data, by providing a robots.txt or similar technique to direct scrapers or robots to the location of their data, or by providing access to XML data, an RSS feed, an Excel or similar spreadsheet or a delimited text file. The merchant may make its data available for scraping via ftp, http, email, or similar service. Collectively, all of these methods of a service gathering site data are referenced herein as "scraping" a web site, and an embodiment of the system can incorporate support for some or all of these approaches to facilitate scraping or gathering of product and sales data for a given merchant, as needed for the analytics described.

Each time that a consumer reviews a page on the merchant's site, information (together with a site specific token) is transmitted from the merchant's service to the consumer's browser. Then the consumer's browser sends this information, usually via the JavaScript approach, to the central database server 102, which captures information about the product the consumer requested.

The collector 108 will collect a summary of the contents of the page. Depending on the nature of the transaction, the collector 108 collects different information. For standard product description pages, collector 108 collects offering information (or content pointers to such information) such as product title, description, and part number. For commerce transactions (typically collected from the order confirmation page) additional information about the order is collected, such as shopping cart contents, shipping, tax, and discounts. In one embodiment, either a cookie or similar identifier is used to identify the user for the purpose of tracking historical buying patterns. In another embodiment, simply information about the product and transaction is stored and no information about the consumer is retained. As the page is displayed to the consumer, this information is then transparently passed by an activity message to the central database server 102. Depending on the embodiment, this data may be encrypted to reduce the risk that a consumer or another party could interfere with the data collection process.

Over time, as web pages are requested by consumers 106, the essential data from active pages of the merchant's product catalog are replicated on the central database server 102. In particular, as purchase transaction pages are processed, a profile of the merchant's e-commerce activity is accumulated in the central database server 102.

A hypothetical consumer 106 purchasing a hard good (e.g., a camera) from a subscribing/collaborating merchant site might browse through several different offering pages before settling on the model that he/she is interested in purchasing. The activity of browsing the inventory and looking at product detail pages results in details about each product being transmitted to central database server 102. Once the consumer 106 makes the decision to purchase the product, the system receives information about the transaction from JavaScript embedded on the order confirmation page, including quantity purchased, purchase price, shipping cost, tax, and any discounts applied. The system may be implemented using only transaction information. In this instance, the category and product data can be passed to the aggregator 120 at the time of the transactions, or a content pointer can be provided at this time for off-line processing in accordance with the application Ser. No. 11/438,976, which is incorporated herein by reference. However, the preferred embodiment provides for both product view and sales transaction information to maximize knowledge of product data view/visit-to-transaction conversion rates.

Examples of other possible content elements for activity messages include but are not limited to time, date, merchant ID, customer ID, IP address, referring source/affiliation (from which search engine or other service did the customer arrive at the merchant's site), referring keyword/query string, advertising cost to generate this sale (which can be provided directly or estimated by the referring source's typical cost per click or percentage fee for a given product's category), UPC or EAN code, manufacturer, brand, manufacturer's product code/sku, product code, product name, product description, price, quantity available, item cost, product category, quantity sold, sales rank and purchase or view flag (used to determine how often products were purchased or viewed). Also possible inclusions are merchant's unique order ID number, tax amount, total transaction price, shipping cost, city, state or province, country, sku number (could be different from product code). Each data point may be the data itself or a pointer to the data (e.g., a url, ftp site, or other remotely-accessible Internet service). A pointer to the content data allows for the data to be accessed asynchronously, securely (without possibility of interception by the user's browser), and can ensure that data is obtained only when it has been updated by the merchant's site and/or accessed by users of the merchant's site. For example, item cost and product description information may be sent as a content pointer for security or efficiency reasons, respectively. Any of the above (or similar) data elements may be included in activity messages such as are outlined in FIGS. 3-5.

Validation and Standardization Parsing. As the central database server 102 receives transaction activity messages, they are validated in real-time and subject to fraud filter 121. Only valid messages are stored into the database 122—all others are discarded. Messages may be stored into a temporary table as "blobs" for future processing. A valid message is defined as a well-formatted message from one of the collaborating sites 104 that subscribes to the service. If the system is configured for encryption, the central database server 102 validates the message source by decrypting the site specific token using the public key in the message header, as well as a private key established between the service and the merchant at setup time. In an alternative embodiment, the system uses a merchant identifier passed without encryption. Here, encryption refers to encrypting the content of the page viewable by the consumer.

Because e-commerce web sites typically serve most data in non-secure mode, but switch to a secure mode when payment data (e.g., credit card information) is entered, the Javascript may be called via a secure SSL-encrypted request to avoid the user experiencing a warning message that the page they are viewing contains both secure and non-secure content. This type of encryption also ensures that a third party watching data flow over the network between the consumer and the central database server cannot interpret the data. However, SSL encryption by itself does nothing to make the content of the data message encrypted to the consumer. (The consumer could use his/her browser's "view source" feature to see the content of the message.) Both SSL encryption and encrypted content as described above are required for a more secure embodiment.

In near real-time, valid activity messages from collectors 108 are parsed, filtered cleansed, enhanced and stored by the aggregator 120 on a first come-first served basis. The parsing process refers to extracting out all product and transaction information from the message. Basic parsing applied to all messages extracts merchant information, time stamp, and message envelope. Product envelopes representing a single product are parsed in a single step. Transaction envelopes are parsed in a two-step process, which extracts product information as well as summary information about the transaction. At this point a variety of cleansing rules are applied that ensure the data being stored into merchant database 122 is in a common format. For example, currency is standardized; products with missing titles, descriptions, manufacturers, keywords, or prices are matched to similar products where possible.

Finally, in the third processing phase the aggregator 120 re-categorizes each product listed in a message, using a stored schema for standardized taxonomy 124. Ideally each transaction is provided to the aggregator 120 with a product category code already in the standardized taxonomy 124 format, defined by tables or other data structures for a tree structure as shown in FIG. 8. If a merchant does not provide a category code in the operator's standardized taxonomy 124 format, the aggregator 120 maps categories based on each product's Universal Price Code (UPC) or equivalent, such as EAN article numbering system. If there is no UPC code available, the aggregator 120 then attempts to determine a standardized category from parsing the product description, keywords, and title, and by considering word or phrase density of the titles, product keywords, and descriptions compared with the titles, keywords and descriptions for each standardized category. Inferred category codes will have substantial variability depending on the breadth and depth of the merchant's supplied product information.

In another embodiment, the aggregator 120 will assign a standardized taxonomy category code for each of the merchant's categories. This is accomplished based on a lookup table that is created either manually by the merchant or service provider or programmatically determined by the system. Mapping tables determined by the system are accomplished by a method similar to how products are mapped to product categories above. However, in this case category keywords or density of all product descriptions or product keywords for products in each of the merchant's categories are used to find the best match between a supplied merchant taxonomy and the standardized taxonomy 124.

Because the automatic category matching can sometimes produce inaccurate mappings, the merchant can override the automatic category mappings in the standardized taxonomy 124 either by providing a data file explicitly matching the merchant's categories to the categories of the standardized taxonomy 124 or that links the merchant's products to categories of the standardized taxonomy 124. Alternatively, the merchant may override the standardized taxonomy 124 categories for the merchant's products via controls available at a web merchant interface 140. The central database server 102 also provides an administrative interface 150 for providing information on which products are grouped together, to minimize the possibility that two or more distinct products are incorrectly being treated as the same item.

Duplicates Identification. In addition to mapping products to categories of the standardized taxonomy 124, the aggregator 120 can also identify products that are identical. This is important to ensure that there are not duplicate records for a single merchant, as well as to provide the basis for accurate comparisons of sales histories between merchants selling the same products. (The system needs to know the products are the same in order to compare the results of multiple merchants for the same product.) The matching algorithm is similar to that explained above for categories, except that the system may now incorporate UPC or EAN codes to determine if an exact match has occurred, and can also utilize price information to confirm that two products are likely the same. For instance, assume the product inventory database contains all of the information, product code, price, title, description, channel, in addition to category data. Then the system can find cases where two or more products have product descriptions and prices that are essentially identical (for instance, the prices are within 20%, the manufacturers match, and descriptions, sorted by word or phrase density, share more than 90% of similar words or phrases.) FIG. 9 shows an example, where Merchant 1234 and Merchant 2345 have different categorization schemes and different product descriptions for identical products. In the example, a particular satellite radio is recognized as being the same product by a programmatic analysis as described. (Also, the example shows a similar matching of a particular model of binoculars.) Alternatively, an administrator working at administrator interface 150 can perform these queries manually and resolve the identity.

The result is that, unlike systems such as Amazon.com that will force a single description for a product in the case of multiple records for the same item, the present system will link both records together as being the same item (giving them the same overall standardized product code) but still enable each item to be maintained with its own title, product description and picture and other attributes. This is helpful if the same database is used in an associated catalog production system as described in application Ser. No. 11/438,976, which is incorporated herein by reference. It also helps subscribing merchants to maintain control over their textual description for each product even though a merchant's competitors may sell the same product. Once two or more product records have been identified as referring to the same product, the previously saved transaction information is augmented with a unique product identifier and/or common product category from the standardized taxonomy 124.

This enhancement process attaches metadata to each product in the standardized taxonomy, which allows the database server 102 to compare products sold on different merchants' sites. So, for example, a merchant with a very broad but shallow offering might categorize digital cameras as part of "electronics," whereas a specialty dealer might categorize this same item as "consumer handheld digital cameras." The central database server 102 would assign this product to a category of "digital cameras" established in the standardized taxonomy. At the conclusion of the parsing phase, each message from collector software 108 has been broken down into a merchant-independent message schema using the standardized taxonomy and stored.

Data Sufficiency for Reporting. Over a period of time, the central database server 102 acquires enough information to provide meaningful reports to merchants about the performance of their product offerings, viewed under the standardized product and product category taxonomy 124. The number of data points required to provide a meaningful insight will vary based on desired accuracy. If we assume a normal distribution of the measured values, we can calculate the number of samples required to have a calculation error within 10% of the actual underlying data. For instance, if we want to calculate the mean of a list of numbers with a standard deviation of X, we need to have at least Y samples to determine that the observed data is close to the actual mean. For example, a product may typically sell for $100, but there is a standard deviation of $20. If we want to be 95% certain that the price is estimated within $5, we need 62 samples. (Source: http://calculators.stat.ucla.edu/sampsize.php.) The central database server 102 can automatically calculate the threshold of data likely required to achieve a given confidence interval. It also provides an administrative interface 150 to allow a human to override the threshold on a global or per product or category basis.

Fraud and Privacy Protection. Depending on embodiment, the central database server 102 and its components can protect the anonymity of consumers, protect merchants from potentially disclosing confidential information beyond what is necessary for the collaboration (and would typically be agreed to as part of the subscription to use the system), and minimize the potential for having the system flooded with fraudulent transactions. As a first line of defense, the central database server 102 uses a fraud filter 121 to only accept incoming transactions from collaborating sites that subscribe to the service, as identified in database 122. Further, in one embodiment of fraud filter 121, protection against domain spoofing is achieved by forcing each transaction passed to the central database server 102 to contain a site-specific token that has been encrypted with public key encryption technology; all other messages are ignored. Together these two steps protect the system from being flooded with bogus transactions from a malicious third party seeking to manipulate the analytics. In one embodiment, as protection against anyone attempting to "sniff" network traffic to obtain any potentially proprietary information, the central database server 102 and fraud filter 121 expect and accept messages in an SSL-encrypted HTTPS format. Finally, as more completely developed in the following section, the fraud filter 121 of central database server 102 provides the ability to exclude out data from other merchants that are potentially attempting to manipulate the system's results. For example, a site might attempt to spoof by transmitting purchase transaction messages that do not correspond to real purchases.

General Approach to Analysis of Data. As the aggregator 120 develops a body of data from web activity by processing the product view and sales transaction information included in the activity messages from collector software 108 and labeling the data according to the standardized taxonomy, it becomes possible to develop a variety of reports. These can begin with relatively simple reports on sales of particular products or products within a product category by merchant. Reports may involve just a single product or product category or products and/or product categories on which a merchant may wish to focus the analysis. Building the reports involves balancing several considerations. The issue of statistically significant information has been mentioned already. With products that have few sales, it may be necessary to include data from a higher or parent product category (i.e., a higher level in the standardized taxonomy) in order to find enough data for statistical reliability. The decisions to include that data and whether and how to reflect that choice in the report become significant, because the report recipient needs to understand the scope and limits of the guidance the report provides.

A further issue is confidential data. The subscribers need to see a view that includes merchants that are, to some extent, competitors, but they will not subscribe if the reports give away data that is too confidential, at least not without receiving some useful data about others in trade. There are at least two techniques to address this. One is aggregating, so that product-specific data associated with a particular merchant is not visible, but rather only higher-level product category data. Another is a dampening technique that takes data showing market strength (e.g., market share) above a certain level and deliberately attenuates it in specified ways. If this dampening rule is communicated and understood, the data can still be informative without revealing too much.

A further dimension of reports is focusing on comparable or peer entities, on the theory that reports that include data from these entities are more useful. There are some reporting contexts in which the important focus is on product or category and the only important issue is what merchants sell that product or category, regardless of size or similar product mix. In other reporting contexts, it is more useful to have some yardsticks for measuring, based on multiple products or product categories, who is a peer or a near-peer and then using only the data of such peers.

The result of all of these considerations is that the data reported often involves a subset of all data that might be reported and/or a masked version of data. The selection and masking choices involved in preparing reports are usually made by the reporter software 110, where data sufficiency and confidentiality issues are involved, but may also be made by the merchant, who can use the merchant interface 140 reporting tools to achieve a desired reporting focus, consistent with the data sufficiency and masking requirements enforced by the system. For example, a merchant may wish to focus on only its more important products, measured by revenue, for reporting, so that resources dedicated to sales optimization are applied where they matter. The following discussion explains how the system addresses these issues.

Real-time Merchant Categorization (Peer Group). Assume that there is a collection of merchants who have subscribed to a collaboration group to track commerce activity on their sites, and to compare their results against competitors in the collaboration group. The merchants may vary in size and composition and range from high-volume discount retailers with a wide variety of inventory to niche merchants that specialize in a single product category. As products are browsed by consumers and purchases completed, the central database server 102 "watches" which categories consumers are actually requesting. (Recall that the categories are normalized to a standardized product taxonomy 124 and that the taxonomy usually has various levels, from the specific products at the lowest level up through increasingly broader categories to the highest level. See FIG. 8 for a sample segment of a taxonomy tree). Based on this information, the central database server 102 may define a profile for a given merchant over a selected period of time using the observed activity messages received at the central database server 102. For each merchant, the central database server 102 determines that merchant's category attribute or profile vector, based on the top product categories (as defined by measures such as number of sales or value of sales) observed over a defined period of time.

More specifically, the central database server 102 calculates the percentage of a merchant's sales for all product category nodes and sub-nodes in the standardized taxonomy 124. If there are n levels in the category tree of standardized taxonomy 124, the central database server 102 starts at the nodes of lowest or n-th level, and sorts by percentage of sales descending. If the present node accounts for more than a minimum materiality threshold, M %, for example, 5% of the merchant's total sales, then the central database server 102 adds that node to a sorted profile list (e.g., an ordered list from most significant to least significant) for the merchant site and removes the same percentage from all parent nodes of that product. (In another embodiment, this removal or subtraction does not occur, which leads to double counting, but may make a report easier to understand for a novice user.) After traversing all sub-nodes in the current level, the central database server 102 moves to the n-1 level and repeats the process until the central database server 102 has reached the top level. At this point, the central database server 102 now has the merchant's sales category profile vector, generally in the form of {product/category1234/$X_1$%, product/category2345/$X_2$%, product/category3456/$X_3$%, . . . } where, for example, "1234" is a product or category label in the standardized taxonomy and $X_i$ is a corresponding computed sales percentage greater than or equal to M %. The vector elements comprise a pair: the node label or name and an associated sales metric (here a percentage of sales) computed for that node.

FIG. 10*a* shows an example of merchant profile vector derivation. On the right-hand side is a partial standardized taxonomy of three levels, with "sporting goods" as the highest level and "camping & outdoors" and "collectibles", etc. at the next lower level. Under the heading "camping & outdoors", the next lower set of categories begins with "ATVs & motorcycles," "auto accessories," "backpacks", etc. (The standardized taxonomy typically continues to specific product levels as shown in FIG. 8, but for simplicity these are not shown in FIG. 10*a*.) Each category includes the percentage of the merchant's total sales attributable to the category, as derived from collector software 108 messages. In this example, the minimum materiality threshold, M % is 5%. In the right-most column, are tables with iterations one, two and three, showing how a pass across the lowest level of categories yields five profile vector elements, while the pass across the next level provides an additional four categories at the next higher level. The third iteration adds a residual value in the highest-level category, "sporting goods". The resulting merchant profile vector has ten elements, with one or more product categories from each of the three levels available as shown in the standardized taxonomy example.

In one embodiment, the number of elements in a merchant profile vector may be limited to a specific number. FIG. 11 shows an example profile vector derivation while limiting the number of profile vector elements to ten and how the system enforces this constraint after each level of the derivation of the category profile vector. Note that the standardized taxonomy in FIG. 10a is used again in this example, but this merchant has different percentage sales values, leading to a different profile vector. The same level-by-level iteration process occurs, but after each level, if there are more than ten elements in the proposed profile vector, only the ten highest-selling categories are maintained.

This profile vector as described above not only characterizes the sales of the merchant, but individual category nodes that comprise the profile vector may often originate from varying levels of the standardized taxonomy tree. This approach enables the system to describe a merchant using the most specific (deeper level of the tree) data available, while ensuring that all elements of the profile represent a meaningful percentage of a merchant's sales. For example, consider two merchants, WalMart and XYZ Organic Grocer. WalMart's profile may include the categories Food 20%, Toys 15%, Household 30%, Health 20%, and Other 15%. XYZ Organic Grocer's profile may include 50% dairy, 30% XYZ brand organic skim milk, 20% other. XYZ Organic Grocer may consider WalMart to be a competitor, because WalMart sells organic milk too. But WalMart does not sell enough organic milk for that category to be a material portion of WalMart's business. But for XYZ Organic Grocer, not only is Food 100% of its business but a specific brand of organic skim milk is a significant portion. Thus, a profile vector for XYZ Organic Grocer derived as above will contain deeper level (more specific) category (or possibly even individual product) data than will the vector for WalMart.

A merchant's profile vector developed as described above may change as the time horizon is varied. For example, during a defined period of time, a large retailer may be running a promotion that causes the bulk of its sales activity to be related to a specific category, which may give the appearance that is a specialty retailer. Over a larger or different period of time, this same retailer may have a dramatically different profile vector, based on the sales data collected at the central database server 102.

Generalizations of Profile Vector Methodology. The profile vector building approach described also solves a common problem arising when reporting the sales of a large merchant in a pie chart (or a bar chart) format. Because a large merchant may have so many products that even the largest selling products or categories represent a small portion of the merchant's sales, such charts typically have many small slivers (or bars) of pertinent data that are unreadable, or they have a few slivers displayed and a large "other" section of the chart. With the method described here, if the materiality threshold M % is set at 5% and the merchant has at least 20 categories, a pie or bar chart of the categories in the merchant's profile vector will very likely have an "other" slice (or bar) that is less than 5% of the chart. This creates a much more meaningful bar or pie chart and solves the "other problem." In general, the objective is to decrease the number of categories by at least an order of magnitude. For a situation that has a very large number of categories, e.g., 1 million, that might still leave thousands of categories but will still provide a useful focus. For many classes of problems, reducing the focus to 100 categories or to 20 categories will provide suitable focus.

The technique is even more widely applicable for representing other data for merchants or other reporting entities. The same "other problem" can arise in connection with accounting information or investment information where the specific data elements are commonly organized in a hierarchy of numerous categories that become hard to understand or that dilute focus when too many such categories are included in a pie or bar chart or report. For example, to understand a highly diverse investment portfolio, it may be useful to focus on primary holdings of highest value, which may be a single common stock or mutual fund or assets in a narrow category, e.g., developing country telecommunications stocks, all developing country stocks or all technology stocks outside the U.S. A useful view of the asset portfolio can be constructed by developing a standardized taxonomy for investment assets held by a reporting entity, with multiple categories at multiple nested levels. The levels proceed from individual stocks or other assets, up through various industry, geography or investment vehicle categories, such as instrument type (stocks, bonds, commodities, options, futures), market capitalization (large cap, small cap), and investment philosophy (growth, value, contrarian, low price to earning ratios, low price to earnings to growth (PEG) ratios, growth at a reasonable price (GARP), size of fund in assets under management). For example, one tree branch might be bonds at a higher level, broken down into U.S. treasury, corporate and municipal subcategories. The municipal category could be further broken down by state or region. At the lowest level of the standardized taxonomy specific bonds form the nodes. Each investment asset in the portfolio is attached to a node at the lowest level with a value, and the aggregate values at higher-level nodes can be derived by addition.

Using the same analysis as for a profile vector, starting at the lowest level with a materiality threshold applied and proceeding to increasingly higher levels in the hierarchy may help to identify what specific assets or categories of assets are significant for investment planning. The results can be shown in the form of a pie or bar chart. Thus, in this context, too, the profile vector and a standardized taxonomy can promote both useful displays and better-focused analysis.

When applied to accounting, this method can use the tree structure inherent in financial reporting to present managers of a reporting entity with single pie or bar chart showing material events at multiple category levels simultaneously. For instance, if a single employee has submitted meal expenses that are material (say more than 5%) with respect to the businesses overall expenses of the reporting entity, then this method would create a report that highlights the anomalous expenses. This method provides an automatic means to highlight such events rather than requiring a person to manually research multiple category levels to find the anomaly or attempt to write business logic to highlight if certain expenses exceed some specified limit. For such an analysis, there might be a number of materiality thresholds associated with a number of nodes. These could be defined in a vector similar to a profile vector, where the percentages represent the materiality "trigger" to flag data at particular nodes.

FIGS. 10b and 10c show examples of use of how this approach could facilitate finding material financial expenses or stock investments. FIG. 10b shows a standardized taxonomy for investment assets and percentages for the value of each of the asset categories in a particular portfolio. The iterations used to derive a profile vector can be used here to provide a profile vector for characterizing the important holdings in the portfolio. FIG. 10c shows a standardized taxonomy for financial expenses and percentages for the value of each of the expense categories for a particular accounting entity and period. The iterations used to derive a profile vector can be used here to provide a profile vector for characterizing the significant expenses incurred. The useful aspect of the system in these applications is that one can see what is material in a very short list of items without having to dig through all of a standardized taxonomy category tree to find it.

Overall Data Flow. FIG. 6 is a schematic data flow diagram that shows how activity messages from websites are aggregated according to the standardized taxonomy to provide standardized sales results by product and by merchant site, supporting derivation of profile vectors and further reports. Although FIG. 6 is a highly simplified view, it is useful to summarize the analysis and features discussed so far and to set up the concepts to be discussed next. As seen at the bottom of FIG. 6, the system receives as basic data inputs 610 the many messages from collector software 108 (FIG. 1). These messages are processed by the aggregator 120 and fraud filter 121 as described above, and those that represent sales transactions are accumulated by product and by selling merchant in database 122. Thus, Merchant 1 620 can be viewed as having in database 122 an associated standardized taxonomy data structure with products C1, C2, C3 and C4 at the bottom. In the time interval of interest, two messages originating from Merchant 1's site activity show a sale of product C1, one message shows a sale of product C3 and one message shows a sale of a product C4. Similarly, Merchant 2 630 can be viewed as having the same associated standardized taxonomy data structure with products C1, C2, C3 and C4 at the bottom, but this data structure is populated with Merchant 2's data. In the time interval of interest, one message originating from Merchant 2's site activity shows a sale of product C1, two messages show a sale of product C3 and one message shows a sale of a product C4. Likewise for Merchant n 640, two messages originating from Merchant n's site activity show a sale of product C2, one message shows a sale of product C3 and one message shows a sale of a product C4.

From the data accumulated on each of the merchants for product C1 and for the time interval of interest a spreadsheet as in FIG. 7 can be developed for product C1, showing the sales of each merchant who made sales of that product. (It should be noted that "spreadsheet" does not necessarily mean an actual spreadsheet application file; it could just as easily be a database query that produces a table of similar results.) Dotted line arrows in FIG. 6 show how data from each merchant contributes to the Product C1 spreadsheet. Similarly, from the data accumulated on each of the merchants for product C2 and for the time interval of interest a spreadsheet as in FIG. 7 can be developed for product C2, showing the sales of each merchant who made sales of that product. (Note that for simplicity FIG. 6 omits dotted line arrows from the C2 nodes to show how data from each merchant contributes to the Product C2 spreadsheet.) Although not shown in the diagram, spreadsheets can also be derived for products C3 and C4. Note that the diagram of FIG. 6 shows only a tiny sample of sales activity messages for each merchant. The spreadsheets typically would accumulate large numbers of sales, and sales of products by merchants beyond those shown in the few sample messages, e.g., Merchant 1 would likely have in the time interval of interest sales of product C2. One way of viewing the spreadsheet data for products C1-C4 is that each node C1-C4 for each merchant gets an assigned accumulated sales value for the interval of interest, which may be viewed as stored at the C1, C2, C3 or C4 node respectively of each merchant's standardized taxonomy data structure.

The Merchant-by-Merchant data on products C1 and C2 permits a spreadsheet with Product Category B1 data by each merchant to be prepared. In effect, for each merchant the C1 and C2 node sales data are summed to get the B1 node value. Although for simplicity not shown in FIG. 6, the C3 and C4 node data can be used to derive a Product Category B2 spreadsheet, as C3 and C4 are the products included in product category B2. Further, FIG. 6 indicates how the data for Product Category B1 contribute to a Product Category A spreadsheet. The similar contribution of Product Category B2 data to the Product Category A spreadsheet is not shown but can be understood from the standardized taxonomy tree structure.

With a sales value now at each node of the standardized taxonomy tree for each merchant, it can be seen that the merchant's total sales can be used to compute a percentage of total sales value for each node of the standardized taxonomy data structure for that merchant. This percentage data becomes associated with each node, which then permits a profile vector to be determined by the methods shown and discussed in connection with FIGS. 10 and 11. A hypothetical result of such a determination is shown schematically in FIG. 6 by a circle around two or more nodes of the standardized taxonomy data structure for each merchant. Each merchant then has a defined profile vector as indicated by the vector shown adjacent node A of each standardized taxonomy data structure. For example, for Merchant 1, nodes C2 and B2 are encircled and the profile vector is $\{C2/x\%, B2/y\%\}$, with x % and y % being the percentage of sales values for nodes C2 and B2 respectively, comparable to the node percentage values shown in the indented standardized taxonomy lists shown in FIGS. 10 and 11.

Although the above discussion presents a method for computing and associating with one or more nodes in a standardized taxonomy data structure a sales volume or sales growth number, the methodology is applicable to many other sales metrics of possible interest to an Internet seller or analyst. For example, analysts of web sales may find of interest metrics such as sales revenue, unit sales, average order size, average shipping charges, average discount; purchase conversion rate; profit margin; profit; return on advertising spend; distribution statistics on order size, distribution statistics on shipping charges, distribution statistics on discounts; and any pricing statistic. Elsewhere in this application are discussed other data of interest that are directly observable from activity messages or derivable from aggregated activity messages, segmented in various ways. Any of these data items may be associated with nodes in a standardized taxonomy structure.

In the preceding, the nodes of the standardized taxonomy data structure are labeled as or associated with a product or product category, but the methodology is generalizable to other types of nodes. That is, a node "category" can be any label that provides an anchor to which data may be attached. As will be seen below, the data associated with a node can be an investment asset name and/or value or an accounting category and its value or other classification bucket. More generally, the node can be an anchor not just for an item of data and its type name, such as a sales volume number, but also a record with multiple values or a vector of values. Still more generally, a node can be an anchor for another data structure, including another tree structure. So the use of the word "category" is equivalent to data bucket or data anchor or node in a data structure and information in any form may be associated with that node. The use of a standardized taxonomy data structure is described herein as a device to organize sales data, but is useful for other data storage and computational data tasks where a standardized taxonomy data structure is a useful way of storing and organizing data.

Basic Product/Category Report. Reports available from reporter 110 vary in complexity. A useful first level report focuses on a single product and reports its sales for one or more defined time periods for all subscribing merchants who sell that product. Referring now to FIG. 7, the "Initial" columns show a hypothetical report covering sales in one product or product category for forty merchants identified by the numbers 1-40 in the leftmost column. The next two columns, labeled PrevSales and CurSales list sales levels (in dollars or units) for the current period (e.g., day, week, month, quarter) and the previous period. The "% Total Sales" column shows each merchant's computed percentage of the total sales for whichever of the two periods has the higher percentage. Thus, for merchant no. 1, the 50,000 in sales over the current period gave it a 19.46% share of the total sales (for the product or product category) of all merchants in that same period as shown in the bottom row of the "Initial" columns of FIG. 7. (Use of the greater of the percentage values in the current period or the previous period accounts for the total of the computed merchant percentages exceeding 100%.)

It is useful to note that this report assumes that the sales levels provide adequate data and shows only merchants who sold the relevant product or product category. That is, it was not necessary to look upward in the taxonomy tree to find data in a parent category. This may not always be the case. Further, the report as it appears in the "Initial" columns of FIG. 6 shows three dominant merchants, nos. 1-3. Also, although they are not named in the report, merchants corresponding to numbers 1-3 may be recognized by those in the business, if the data shown in the "Initial" columns were released in that form. Thus, this report may not be suitable for circulation, depending on the terms of subscription by the participant merchants. The next section discusses how the market position information can be masked, so that sensitive data is not directly revealed, but useful data still reported.

Dampening Contribution of Large Merchants. In one embodiment, the central database server 102 "normalizes" data such that no one merchant's traffic skews the system's results. This allows the central database server 102 to compare more fairly large and small merchants together. It also minimizes the impact if a given merchant attempts to manipulate results through fraudulent transactions.

The normalization or dampening algorithm limits a single merchant to no more than a relatively low contribution limit percentage C, e.g., 5%, of the data that makes up any given statistic. To achieve this balance, the central database server 102 applies an iterative normalization algorithm that generates an adjustment ratio to dampen the results of a merchant that exceeds the selected contribution C value (here 5% of total sales by units or sales revenue volume for a given sales statistic). In other embodiments the dampening algorithm may remove from the report a entity that is over a contribution limit C or reduce the metric that is considered confidential to a level where confidentiality is no longer a concern.

This approach encourages participation in the system. By restricting the influence of any one merchant, merchants have less worry about giving away all their confidential sales data. (If a subscriber-merchant's data at a maximum represents no more than 5% of any statistic, that merchant receives at least 20 times more information than it provides. So this is a collaborative competitive analysis system.) This approach also ensures that reports are representative of the broad market and helps minimize the possibility of any merchant attempting to manipulate the system's results through fraudulent transactions.

FIG. 7 shows a product/product category report in which a dampening adjustment is applied. To achieve the balance between having enough data to be statistically significant and ensuring the confidentiality of a participant's sales data, the central database server 102 first counts the number of transactions and sums the total value of sales for each category in the standardized taxonomy 124 over the relevant time period(s) (e.g., day, week, month, quarter, year). This step figures out the sales patterns at each product category in each level. If there is insufficient data for any category to ensure both statistical significance and merchant integrity, the system flags that category as having insufficient data.

If there is enough data at a given product or product category node, the data can be compared against a given merchant's sales results for that product or product category. If there is not enough data for a product or product category at a given level, the system will continue to go up levels (i.e., to parent and grandparent nodes) until enough data is available to create a comparison between a merchant and the market. (This comparison can be done for individual elements of the merchant's feature vector, or, as described below, may be weighted based upon several or all of the merchant's profile vector categories by multiplying the results of other merchants for a given category level (or higher level if not enough data is available) times the weighting of the percentage of sales of the merchant in that category.)

The product/product category analysis may be performed for each time period. While theoretically the analysis could be completed for any time period, the preferred embodiment may pre-calculate performance of each product or product category in the standardized taxonomy 124 over several pre-specified time periods on an off-line basis to accelerate reporting speed when a merchant seeks comparative analysis. Merchants with no previous period sales in a given category are excluded from that category's calculations for that time period. For each merchant that has either prior period or current period sales over the contribution C threshold (for example 5%), the central database server 102 determines an adjustment factor to bring the contribution from that merchant down to a value less than the threshold contribution value C. For those merchants requiring an adjustment factor, the central database server 102 may increase the adjustment by an acceleration factor (for example, 25%) to reduce the number of iterations required to complete the calculations.

FIG. 7 shows an example of this normalization or dampening. As discussed above with respect to the "Initial" columns of FIG. 6, the central database server 102 has sales data on a given product or product category for 40 different collaborating merchants over a defined previous and a current period of time. After summarizing the sales, the central database server 102 calculates that merchant nos. 1, 2 and 3 each account for more than C (=5%) of the total sales for this category; thus, their contributions need to be dampened. For merchant 1, the central database server 102 divides the total sales percentage (19.46%) by the maximum contribution percentage (5%), which results in an adjustment factor of 0.26. To help the equation converge faster, server 102 reduces the 0.26 adjustment factor by 25%, which results in an adjustment factor of 0.19. The server 102 then uses this calculated adjustment factor to adjust the previous and current sales and repeat the exercise on the dampened data. This exercise is repeated two additional times until no merchant's contributions exceed 5% of total sales. The columns in FIG. 7 headed Round2 and Round3 show the additional adjustments.

The result of this method is a trade off between accuracy of market position and trend results vs. the need to maintain confidentiality of all participants by not having their data comprise more than (for example) 5% of any calculation. The system can also report what percentage of the market size for a given category is represented in the dampened results for that category. For example, in FIG. 7, the percentage of current period market size reported in the dampened results would be the total of the CurSales for "Round 3" (the dampened results) ($42,865.93) divided by the total of the CurSales of "Initial" ($256,900) times 100.0, or 16.69%. Based on administrator control or merchant control exercised at interfaces 150, 140, results with a coverage (consider this to be similar to a confidence factor) less than a given level (say 85% of the overall market), may be ignored or at least highlighted when producing results for the subscriber merchant.

Utility of the technique is shown by referring again to the Walmart—Organic Grocer XYZ example from above. When a report of how Organic Grocer XYZ's sales trends for XYZ brand organic skim milk is run (because XYZ brand organic skim milk is such a large amount of Organic Grocer XYZ's sales that Organic Grocer XYZ's profile vector includes a specific element for Organic Grocer XYZ's organic skim milk), there may be no directly comparative data from other merchants, as the XYZ product is unique to Organic Grocer XYZ store. So the system will keep moving up the standardized taxonomy category tree until it finds both enough data for a relevant comparison and enough data from different merchants to ensure that no merchant represents more than (for example) 5% of any given statistic. Let's assume it has to move up to the Skim Milk category to find enough relevant data. Even though WalMart may sell one thousand times the Skim Milk of Organic Grocer XYZ, WalMart's numbers will not dominate the statistic shown to the merchant about the market performance of Skim Milk due to a dampening adjustment applied to WalMart's market position percentage.

On-Demand Reports; Collaborative, Competitive Analytics. Upon request made via the merchant interface 140 or the administration interface 150, the central database server 102 provides the ability to produce reports that provide insight on the competitive performance of a given merchant's offerings. The reporting interfaces show data such as competitive performance of the merchant versus the overall market, competitive performance of the merchant against a peer group, market research of sales in various category areas, and/or specific product pricing of merchant vs. the market across various sales channels (e.g., comparison shopping engines).

More specifically, a merchant can seek summary information about the sales performance of any its products or categories or its entire inventory relative to a collaboration peer group or the Internet as a whole over a selectable period of time. This type of report is referred to as collaboratively competitive analytics. Limited specific information about any other site is provided—only aggregate data. Data for category levels that cannot be uniquely identified are only included as part of summary calculations for higher (more generic) category levels. Data on specific product performance is treated as if the product data is the lowest category level. Thus, if not enough data is available at a product level to maintain both statistical significance and to ensure that no merchant's contribution to any statistic about that product exceeds (for example) 5%, then data for the specific product is not presented to a merchant using the system. Instead a summary of performance against a higher-level category is computed. In some embodiments, it may be desirable for the merchant to view their results and comparative results in the merchant's own category taxonomy instead of the standardized taxonomy 124. This is possible by direct lookup if the aggregator 120 or merchant assigned a standardized taxonomy category code for each of the merchant's categories, or by using automatic category matching similar to the method described above for matching the merchant's categories to standardized taxonomy category codes. In either case, the mapping rules and/or data used for matching the merchant's categories to the standardized taxonomy categories are stored in the database 122.

FIG. 12 shows one form of report that can be generated by the reporter 110, in one or more of its Report Modules A-C, 112, 114, 116. This hypothetical report shows a comparison of the sales growth of one current subscriber-merchant for one product or category to the aggregate sales growth performance of other subscriber-merchants selling the same product or category. Typically, a merchant might request this for one product or product category contained in the merchant's profile vector. However, a merchant might also request a report for a product or product category of lesser current significance but one that the merchant hoped to strengthen. In addition, a merchant (or another party such as an industry analyst) might seek a report on a product or category purely as a matter of market research, because the merchant has no sales in the product or product category. Of course, for the latter there can be no comparison relative to merchant performance, but data on the sales growth experience by those active in the product or category can be presented.

The data leading to such a report is collected in the manner described above and stored in the databases 122. The merchant or other person seeking the report requests it at interface 140 or 150 by providing the product or product category identification according to the standardized taxonomy system that has been used to build merchant by merchant reports for each node (product or category) in the standardized taxonomy. FIG. 7 provides a hypothetical example of a spreadsheet developed to show sales in one product or product category for multiple merchants and one or more time periods. To provide the basis for a report as in FIG. 12, the results of multiple spreadsheets for all products for the current merchant and for all subscriber-merchants must be developed. The period-to-period rate of growth can be computed for a sequence of consecutive periods, such as the consecutive weeks shown in FIG. 12. In the embodiment shown in FIG. 12, the plot shows rates of growth of (a) sales for the current merchant for all products; (b) sales for the current merchant for a particular product or product category; (c) sales for all subscriber merchants for the particular product or product category; and (d) sales for all subscriber merchants for all products. See FIG. 12. If a request is made for a product or product category report where the data collected is insufficient, the report will be declined or a report for a higher level in the standardized taxonomy will be offered and provided.

As noted above, each merchant can have a profile vector derived for its reported sales data for any specified time period. FIG. 13 shows a hypothetical report that can built based on a current profile vector for sales over a recent quarter (although any time period could be used). The subject merchant for the report has a current profile vector consisting of {paintball/50%, sporting apparel/45%, other sports/5%}. Using a spreadsheet for sales in each of the three product or product categories in the vector, the sales for the "this quarter" and for "last quarter" can be quantified. This leads to a "this quarter" over "last quarter" sales growth figure of 8.6% for the subject merchant and the three product or product categories.

For comparison, the total sales for all merchants having sales in the same three product or product categories can be calculated for the same "this quarter" and "last quarter". These three sales figures are converted into weighted sales numbers by multiplying each by the subject merchant's profile vector percentage for each of the three product or product categories. These weighted sales numbers for the three products or product categories are then used to compute a "this quarter" over "last quarter" sales growth figure of 6.0% for the all merchants and the three product or product categories. The "all merchants sales growth" provides a baseline for the subject merchant, after it has been weighted to better match the profile vector of the subject merchant. FIG. 13 shows a sample calculation and a graphical presentation of the comparative results.

A subject merchant's profile vector may provide a basis for another sales growth comparison. As seen in FIG. 14, computing this comparison begins with using the subject merchant's profile vector to compare to the profile vectors of other subscriber merchants to find a peer group. One peer group that may be defined has a match to each one of the product or product categories as those in the profile vector of the subject merchant. (In one embodiment, only products or product categories are compared for the match; the percentages included in a profile vector are ignored. In another embodiment, proximity to the percentage values may also be considered in defining the match criteria.)

However, such a peer group may be too limited to provide statistically significant results. In another embodiment, a less exact match is required. The less exact match is defined less strictly by considering a product or product category match to exist between the subject merchant vector and another merchant's vector if a match is found by moving from the subject merchant's product or product category (i.e., the subject merchant's profile vector component) up to a parent or grandparent category or down to a child product/category in the standardized taxonomy to determine if the other merchant's vector has such a nearby match. (That is, the match is deemed found for a given category if a profile vector component, one broadly defined to include not just a specific category node, but the parent, grandparent or child node relatives of that node, finds a match in the profile vector of a peer candidate merchant.) In other embodiments, a direct match may be given a stronger weighting than a match to a parent, grandparent, or child. Also, matches that are fewer levels apart may receive higher weights. For instance the weighting for a parent match may be higher than the weighting for a grandparent match, which would be higher than the weighting for a great-grandparent match.

The match criteria may be further loosened by finding a match of at least some percentage X of the product or product categories in the subject merchant's vector, where X may be a selectable parameter, set, for example, at 75%, 80%, 85%, etc. The matching procedure of this embodiment may be easier to understand if each merchant involved in the comparison has a profile vector of the same length.

FIG. 14 shows in a table a hypothetical comparison of the five profile vector categories of a subject merchant with five categories of several other merchants. The matches, whether direct or requiring an up or down navigation in the standardized taxonomy categories as permitted by the matching criteria are also shown. Once a set of peer merchants is defined based on matching to the subject merchant's profile vector, the system calculates from data stored in database 122 a current period and last period sales figure for each merchant for all products (or alternatively, all products in the product or product categories that made up the matching vector). The resulting period-to-period increase value computed for each merchant in the peer group can also lead to computing a rate of growth for the entire peer group selected. That peer group growth rate becomes a baseline for comparing to the growth rate of the subject merchant. As seen in FIG. 14, the peer group had a slightly negative growth rate of 0.6%, while the subject merchant had a growth rate of over 8%. As seen in FIG. 14, the result may be graphed.

A wide variety of matching criteria other than the schema shown in FIG. 14 are possible. Thus, the peer group for purposes of comparison may be found by a matching schema that permits greater or lesser up-down navigation in the standardized taxonomy or that requires a higher or lower matching percentage than 80%. To establish an appropriate peer group for the desired period the central database server 102 "walks" the merchant site's category profile vector and obtains sales from other sites that share most attributes (say 80%) of the merchant's profile vector for the time period being evaluated. If there are not a sufficient number of data points to provide a statistically significant report, the central database server 102 may navigate up one parent category level and repeat the calculation. Unlike the approach of comparing the results of a merchant against its profile vector components as described earlier, this method of measuring a merchant's performance against other merchants does not recurse up the category tree until a match is made. For a given Merchant A to be deemed a peer of Merchant B, Merchant B must have at least 80% (for example) of its categories in its profile vector match Merchant A's profile vector. A match is defined as Merchant B's category being the same as Merchant A's category's parent or lower (in one embodiment) on the category tree. This allows some flexibility for a match but ensures that a 'match' has fairly similar category vector characteristics.

Inferring Competitive Pricing Data. In another aspect, data for raw offering prices for a given product for all collaborating merchants across all marketing channels is collected for all merchants and made available to all merchant participants. While this approach defeats the secrecy of merchant pricing data, the price a merchant promotes for a product is not secret once the merchant acts to advertise it. However, the underlying unit sales data is private and the collaborative competitive analysis system can report valuable data to all participants while limiting the amount of confidential information being provided by any one participant to a level that is acceptable to all participants. (This compromise principle is described elsewhere in this document.) This approach maintains the privacy of non-public data while exposing public data to all participants. For public data, the results are much like how a merchant can view the offer prices of its competition either by viewing competitors' stores or by searching on search engines or comparison shopping sites for competitive pricing data. The pricing data of the present system is inferred from the many activity messages processed into the database 122. Assuming an activity message carries with it not only the pricing information but also the channel where that price was established, each transaction provides price data for a product that can be sorted into a table as shown in FIG. 15. The Channel 1, Channel 2, etc. entities in FIG. 15 may be price comparison sites (e.g., Froogle, NexTag), larger marketplaces (e.g., eBay) or other seller sites of interest.

Some advantages of the present system for deriving a inferred pricing data report over other approaches to get pricing data are as follows:

The data collection of competitive pricing may be automatic. The merchant can see competitors' prices without surfing many web sites or writing scrapers to gather the data.

The merchant does not have to worry about violating 'terms of use' restrictions from search engines or comparison shopping sites. Many of these sites prohibit users from writing automatic tools to obtain pricing information, as the comparison shopping sites believe that their aggregation of pricing data is their property. Because the present system obtains its data directly from merchants (or the customers of the merchants) who participate in the service, the system is able to obtain this data without ever accessing the comparison-shopping sites or search engines. (For instance, if a merchant notifies the system that a sale was made on NexTag for $100, the system knows that the merchant was offering that product for sale on NexTag for $100. But the system never accessed NexTag to discover this information.)

If there is a price change during the period of interest, that change can be tracked from the transactional data received.

Each merchant can benefit by seeing the prices offered by competitive merchants in multiple channels simultaneously. Thus the system provides better information than buying comparison-shopping analysis services, because these engines only see the comparison price data available for the single site. The present service builds up a picture of what are the offers on all of these sites by inference from individual transaction observations without ever accessing their data.

Where an activity message includes data such as the referring source or the search string (one or more keywords) in the query leading to the activity, sorting the pricing information on these parameters becomes possible. This may be valuable to recognize more effective channels and keywords for search strings.

Overall, this aspect of the present system compiles public data to make all participants smarter about how to succeed in the marketplace without violating terms of any website, search engine, or comparison-shopping service.

Depending on the type of pricing information provided in records, merchants can "drill down" into the pricing report's underlying data for more detailed information, such as information about typical discounts that are applied, quantity sold, number of data points used in the calculation, etc. Thus, the report as in FIG. 15 may have metadata attached to the table cells that shows the date of any price changes and patterns of discounts from the list price that are observed in individual sales activity transactions in various channels.

FIG. 15 also shows additional enhancements of the pricing report. For example, the reporter 110 can be configured to calculate the mean, minimum, maximum, standard deviation, and similar statistical measures from prices of a product that vary across multiple channels. Then the system can compare this information against a subject merchant's prices to highlight areas where the merchant may be high or low against the inferred market pricing.

Market Share Information. The data that the central database server 102 collects can be used to build a variety of useful reports about purchase activity for which it receives data. Some merchants seek data for a total market context. Initially, the present system will receive transactions from a limited number of subscriber merchants in any given market or market sector. With a high penetration rate for certain defined markets, it may be possible to see a high percentage of all transactions in that market. At that point the system can report market share data, or something closely approximating it, for certain markets. The central database server 102 then provides a mechanism for calculating a market share report for e-commerce activity on the Internet with a greater degree of fidelity than is available today through phone and self reported merchant survey. By using aggregate sales data from many sites and categories the central database server 102 can report on the change of transaction activity occurring on the Internet. This type of information is useful to journalists and investment analysts.

Until the system has enough subscriber penetration to begin to collect almost all data in any market, other methods of estimating market share may be provided. If there are publicly reported market sizes of overall sales or per category, whether based on all sales channels or on Internet sales channels, then these amounts can be compared with the fraction that flows through the present system. If that fraction appears to be relatively stable and appears to be a representative sample of all sales, then tracking the sales flowing through the system may be viewed as one way to get a representative periodic (e.g., daily, weekly or monthly) sample of all the action in one or more markets or categories. Then, the system can generate a report for the merchant showing the merchant's estimated market share for the entire market or specifically limited to one or more selected categories.

Other Reports and Data Views. In the merchant interface 140, an ability to benchmark a given site relative to peers is provided. While the examples above demonstrate how to calculate overall sales and growth rates, the same methods can be utilized to determine other comparative performance statistics at varying category levels and while ensuring the confidentiality of certain participant information. Examples of the type of insights that can be obtained include information about product seasonality, success of various marketing channels, peak transaction days and times, most popular promotions, and best selling products. Still other reporting possibilities exist and may be embodied in software in one or more of the Report Modules 112, 114, 116.

A merchant can examine its own results compared to the market for any level of data (aggregate shopping, category (any level of the tree), or even down to individual products).

Merchants can compare their results against others entities for aggregate Internet shopping, similar stores, individual categories at any level of category tree, or down to individual products.

Merchants and third parties can complete market research analysis (or what-if) for any category (at varying levels) or down to individual products, whether or not merchant sells these products.

Merchants and third parties can calculate statistics on collected data such as number of items sold, average sale price, peak transaction times, etc. Similarly, we can calculate the number of items sold, value of items sold for each category (or product) vs. the referring channel combination.

Merchants and third parties can examine trends such percentage change in sales (or number of total sales) over period, shipping costs, shipping percentage of sales.

Merchants and third parties can obtain information about referring channel (e.g. pie chart of how many sales came from Google Adwords, MSN, AOL, Overture, E-bay, Amazon, etc.).

If cost information is provided, the central database server 102 can provide return on investment conversion rate (number of purchases/number of product visits or views) for a given merchant as well as a peer group for a specific merchant. Similarly the central database server 102 can provide insight into the allocation of sales by keywords for each pay-per-click ad or search engine channel.

Specialized Sales Reports. Another view that may be helpful to sellers is one that helps to find effective referring sources and keywords or search strings commonly used by purchasers. The spreadsheet of FIG. 17 shows an example of calculations (with possible dampening) for sales results by referring source for a specific product category over a specified period.

Assume that the system already calculated results for a single product category (e.g. "Car Audio") and that there was enough data to meet statistical significance and merchant confidentiality requirements. Next, the system may calculate sales performance for specific referring sources (e.g., NexTag) within that category. In this instance, the number of sales, revenue from sales, and Average Order Size are calculated for that category for that referring source and for a given time period. The method of calculation is essentially identical to that described for FIG. 7, but here the report shows a different metric being calculated and it being calculated on a per category/per referring source basis simultaneously. This report provides metrics evidencing the success of various marketing channels and keyword strategies.

FIG. 16 shows schematically how the system may calculate the sales results per referring source, per search string (one or more keywords), or both per referring source and per search string, all specific to a single product category. The idea here is that Car Audio had enough significant data to provide statistically significant results without violating confidentiality constraints. So the system then calculates the sales statistics within that category for each referring source (here Google and NexTag are shown as examples) and also for each search string ("xm satellite" and "car radio" are shown as examples) that brought customers to purchase items in the Car Audio category.

In this case, for referring sources, there was not enough data for Google within the Car Audio category to provide acceptable results; however, NexTag did have enough results. For search strings, both "xm satellite" and "car radio" had sufficient data for acceptable results. Thus, the system proceeded to calculate results for Car Audio sales that were referred by NexTag for the "xm satellite" and "car radio" search strings. In this manner, the system can calculate results to the maximum possible depth (while maintaining significance and any dampening constraints). When a certain level of the process experiences inadequate data, the system knows that there will not be valid data at lower levels and abandons any attempt for deeper processing from that node.

Also shown in FIG. 16 is processing for the 'Satellite Radio' category level. Here, "car radio" did not yield sufficient results, so the only per category per referring source per search string calculation that was attempted was for "Satellite Radio", "NexTag", and "car radio". Also, no calculations for Google referring source for this category were attempted, because the calculation for the 'Car Audio' category did not yield adequate results for Google as referring source.

Also shown in FIG. 16 is the attempt to calculate results for the 'Sirius Satellite Radio' category level. The data were not adequate, so no further processing of 'Sirius Satellite Radio' children categories or any referring sources or search strings was attempted.

It should be noted that FIG. 16 is setting up a tree structure in which the standardized taxonomy tree structure is used to lay out the products and product categories, and each seller site can have an associated taxonomy tree structure for its data. A node in one of the standardized taxonomy tree structures, while containing metrics for that node level, could become the anchor for one or more additional "subtree" structures. For example, a product or product category node of a standardized taxonomy tree may also contain separate tree structures for metrics on search strings associated with that product or product category or for metrics on referring sources associated with that product or product category. In the case of a search string tree structure, each node will be a distinguishable search string, which may represent a condensation or parsed representation of search strings actually used, based on how these are processed in search engines.

Each subtree node may also have additional nodes or subtrees. For example, each node on the search string subtree could contain a referring source subtree and vice-versa. Note that there can be symmetry among subtrees. For instance, metrics for a search string/referring source combination will be the same as metrics for a referring source/search term combination. The system can avoid duplicate processing by identifying this symmetry or be being constructed to only permit certain subtree types to be calculated from a given subtree type. Thus the search string/referring source combination nodes in FIG. 16 are shown as links instead of as redundant subtrees because the system does not need to perform both sets of subtree calculations.

Although the invention has been described with reference to embodiments, persons skilled in the art will recognize that changes may be made in form and detail without departing from the spirit and scope of the invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A computer-implemented method for cataloging and reporting Internet merchant data comprising:
   using a computer processor to execute the steps of
   receiving at a data center a plurality of site activity messages regarding two or more seller sites and storing the site activity messages in computer readable memory;
   retrieving a standardized taxonomy schema with a node for each of two or more products;
   deriving from the plurality of site activity messages a sales metric for the two or more products;
   for a specific time period, aggregating the sales metric data for each of the two or more seller sites and the two or more products; and
   deriving a comparative report for the sales metric for the two or more seller sites, by reference to at least one of the two or more products in the standardized taxonomy schema, wherein the two or more seller sites in the comparative report are selected based upon similarities of a seller site profile vector calculated for each of the seller sites, wherein the seller site profile vector comprises a distribution of total merchant sales of the seller site for each of at least two nodes of the standardized taxonomy schema over the specific time period.

2. The method of claim 1 wherein the step of receiving at a data center a plurality of site activity messages comprises receiving messages with product identification and sales transaction data.

3. The method of claim 1 wherein the step of retrieving a standardized taxonomy schema comprises retrieving a standardized taxonomy schema in the form of a tree having at least a specific product level with a node for each of two or more products and a product category level with at least one node that encompasses two or more products from the specific product level.

4. The method of claim 3 wherein the step of deriving a comparative report for the sales of the two or more seller sites comprises deriving a report for a specific product or product category in the standardized taxonomy schema in response to having sufficient aggregated data for the at least one specific product or product category.

5. The method of claim 3, wherein:
the step of deriving from the plurality of site activity messages a sales metric for the two or more products comprises computing for each of the two or more seller sites and for each specific product and each product category level in the standardized taxonomy schema a sales metric and associating the computed sales metric with each of the nodes of the standardized taxonomy as applied to each of the two or more seller sites.

6. The method of claim 3 further comprising applying to the activity messages a fraud filter to detect transactions that are not legitimate messages from a seller site that subscribes to activities of the data center.

7. The method of claim 1 wherein the step of receiving at a data center from a plurality of site activity messages comprises receiving messages by a method selected from the group comprising: Javascript messages from Javascript embedded on website pages; an HTML image; a proxy server forwarder or signed browser applet; server-to-server communications in a CGI application, a SOAP call, an XML message, a Web log, spreadsheet or a proprietary protocol to convey data; and a persistent browser cookie combined with JavaScript technology.

8. The method of claim 1 wherein the step of deriving from the plurality of site activity messages a sales metric comprises deriving a sales metric from the group comprising: sales revenue, unit sales, average order size, average shipping charges, average discount; purchase conversion rate; profit margin; profit; return on advertising spend; success of various referring channels, peak transaction days and times, most popular promotions, best selling products; distribution statistics on order size, distribution statistics on shipping charges, distribution statistics on discounts; and any pricing statistic.

9. A computer-implemented method for cataloging and reporting Internet merchant data comprising:
using a computer processor to execute the steps of:
receiving at a data center a plurality of site activity messages regarding two or more seller sites and storing the site activity messages in computer readable memory;
retrieving a standardized taxonomy schema in the form of a tree having at least a specific product level with a node for each of two or more products and a product category level with at least one node that encompasses two or more products from the specific product level;
computing from the plurality of site activity messages, for each of the two or more seller sites and for each specific product and each product category level in the standardized taxonomy schema a sales metric wherein the computed sales metric is associated with each of the nodes of the standardized taxonomy as applied to each of the two or more seller sites;
for a specific time period, aggregating the sales metric data for each of the two or more seller sites and each of the two or more products;
deriving a site profile vector by selecting specific product or product category nodes by identifying at least one node and an associated computed sales metric for each of the two or more seller sites that exceeds a materiality threshold M % and defining a profile vector with reference to such at least one node and
deriving a comparative report for the sales metric for the two or more seller sites, by reference to the sales metric of at least one of the two or more products in the standardized taxonomy schema wherein the two or more seller sites that are compared share similar seller site profile vectors.

10. The method of claim 9 wherein the step of deriving a profile vector further comprises deriving a profile vector in the form: {product/category1/$X_1$%, product/category2/$X_2$%, product/category3/$X_3$%, . . . product/categoryN/$X_N$%} where, product/categoryN is a product or product category node label in the standardized taxonomy and $X_N$ is a associated sales metric greater than or equal to M %.

11. A computer-implemented method for cataloging and reporting Internet merchant data comprising:
defining a contribution threshold C;
using a computer processor to execute the steps of:
receiving at a data center a plurality of site activity messages regarding two or more seller sites and storing them in computer readable memory;
retrieving a standardized taxonomy schema in the form of a tree having at least a specific product level with a node for each of two or more products and a product category level with at least one node that encompasses two or more products from the specific product level;
computing from the plurality of site activity messages, for each of the two or more seller sites and for each specific product and each product category level in the standardized taxonomy schema a sales metric wherein the computed sales metric is associated with each of the nodes of the standardized taxonomy as applied to each of the two or more seller sites;
responsive to a computed sales metric associated with one of the nodes of the standardized taxonomy exceeding contribution threshold C, applying a dampening algorithm to the computed sales metric;
for a specific time period, aggregating the sales metric data for each of the two or more seller sites and the two or more products;
deriving a seller site profile vector by selecting specific product or product category nodes by identifying at least one node and an associated computed sales metric for two or more seller sites and defining a profile vector with reference to such at least one node; and
deriving a comparative report for the sales metric for the two or more seller sites, by reference to the sales metric of at least one of the two or more products in the standardized taxonomy schema wherein the two or more seller sites that are compared share similar seller site profile vectors.

12. The method of claim 11 wherein the dampening algorithm uses a reduction factor applied iteratively to the computed sales metric until the computed sales metric value associated with the one of the nodes of the standardized taxonomy that exceeds the contribution threshold C no longer exceeds C.

13. A method for characterizing data organized in a standardized taxonomy schema in the form of a tree having a lowest level with a node for two or more categories for that lowest level and at least one higher level with at least one node that encompasses the two or more categories from the lowest level, the method comprising:
defining a common metric for use at each node;
using a computer processor to execute the steps of:
for a reporting entity selected from the group consisting of an on-line seller of products, using a standardized hierarchical taxonomy schema of product categories, an investment portfolio, using a standardized hierarchical taxonomy schema of investment asset categories, and an accounting entity using a standardized hierarchical taxonomy schema of accounting categories, computing for data associated with each of a plurality of nodes in the standardized taxonomy schema the common metric; and
deriving a profile vector for the reporting entity by selecting at least one node from the lowest level or at least one higher level with an associated computed common metric for a specified reporting entity that exceeds a materiality threshold M % and defining a profile vector with reference to such at least one node that reflects the magnitude of the computed common metric for each node.

14. The method of claim 13 wherein the step of deriving a profile vector comprises defining a profile vector in the form: {category 1/$X_1$%, category2/$X_2$%, category3/$X_3$% . . . categoryN/$X_N$%} where, categoryN is a node label in the standardized taxonomy and $X_N$ is the corresponding computed common metric greater than or equal to M %.

15. The method of claim 13 wherein the reporting entity is an investment portfolio, the standardized taxonomy schema is a hierarchical set of investment asset categories and the computed common metric is the value of the assets in the portfolio that are in the category of any node.

16. The method of claim 13 wherein the reporting entity is an accounting entity, the standardized taxonomy schema is a hierarchical set of accounting categories and the computed common metric is the value assigned to the accounting category of any node.

17. The method of claim 13 further comprising limiting the number of elements in the profile vector to a value N that is at least an order of magnitude less in size that total number of nodes in the standardized taxonomy schema.

18. The method of claim 13 further comprising limiting the number of elements in the profile vector to a value N that is 100 or less.

19. The method of claim 13 further comprising:
limiting the number of element in the profile vector to a value N that is 20 or less; and
outputting to a computer display or printer the elements of the profile vector in a form selected from the group comprising a pie chart, a bar graph and a tabular listing.

20. The method of claim 13 further comprising correcting the magnitude of the computed common metric of a parent node of a selected node by removing from the magnitude of the computed common metric of the parent node the magnitude of the computed common metric of the selected node.

21. A method for characterizing data organized in a standardized taxonomy schema in the form of a tree having a lowest level with a node for two or more categories for that lowest level and at least one higher level with at least one node that encompasses the two or more categories from the lowest level, the method comprising:
defining a common metric for use at each node;
using a computer processor to execute the steps of:
for a reporting entity, selected from the group consisting of: an on-line seller of products, using a standardized hierarchical taxonomy schema of product categories, an investment portfolio, using a standardized hierarchical taxonomy schema of investment asset categories, and an accounting entity using a standardized hierarchical taxonomy schema of accounting categories, computing for data associated with each of a plurality of nodes in the standardized taxonomy schema the common metric; and
deriving a profile vector for the reporting entity by selecting more than one node from the lowest level or at least one higher level which is responsive to the magnitude of the computed common metric for each node, whereby the profile vector has multiple elements and further comprising placing the elements in an ordered list.

22. The method of claim 21 wherein the ordered list is based on the magnitude of the computed common metric.

23. A computer-implemented method for collecting sales data from Internet merchant data comprising:
using a computer processor to execute the steps of:
receiving at a data center a plurality of site activity messages regarding two or more seller sites, said messages generated by at least one internet web-page of the two or more seller sites in response to a user viewing the web-page or purchasing a product offered for sale on the web-page, and containing sales data from one or more channels and search string information used by a user of the internet web-page to locate the internet web-page that generated the site activity message;
storing the site activity messages in computer readable memory;
deriving from the plurality of site activity messages sales data for at least one product category in a taxonomy schema; and
for a specific time period aggregating the sales data for the two or more seller sites and deriving an inferred product sales data report that includes information on the search string information contained in the site activity messages.

24. The method of claim 23 wherein the step of receiving at a data center a plurality of site activity messages comprises receiving product view activity messages that include or reference product sales prices.

25. The method of claim 23 wherein the step of receiving at a data center a plurality of site activity messages comprises receiving sales activity messages that include or reference product sales prices.

26. The method of claim 23 wherein the step of receiving at a data center a plurality of site activity messages comprises receiving activity messages that include referring source information from two or more referring sources and sorting the sales data responsive to the two or more referring sources.

27. The method of claim 26 wherein the two or more referring sources are price comparison sites.

28. A computer-based system for cataloging and reporting Internet merchant data comprising:
database configured to receive a plurality of site activity messages regarding two or more seller sites;
a computer processor coupled to computer readable memory and programmed to:
retrieve a standardized taxonomy schema with a node for each of two or more products;
derive from the plurality of site activity messages a sales metric for the two or more products;
aggregate for a specific time period the sales metric data for each of the two or more seller sites and the two or more products; and
derive a comparative report for the sales metric for the two or more seller sites, by reference to at least one of the two or more products in the standardized taxonomy schema wherein the two or more seller sites in the comparative report are selected based upon similarities of a seller site profile vector calculated for each of the seller sites, wherein the seller site profile vector comprises a distribution of total merchant sales of the seller site for each of at least two nodes of the standardized taxonomy schema over the specific time period.

29. The system of claim 28 wherein the database receives messages with product identification and sales transaction data.

30. The system of claim 28 wherein the standardized taxonomy schema comprises a standardized taxonomy schema in the form of a tree having at least a specific product level with a node for each of two or more products and a product category level with at least one node that encompasses two or more products from the specific product level.

31. The system of claim 30 wherein the comparative report for the sales of the two or more seller sites comprises a report for a specific product or product category in the standardized taxonomy schema in response to having sufficient aggregated data for the at least one specific product or product category.

32. The system of claim 30, wherein:
the computer processor is further programmed to derive from the plurality of site activity messages a sales metric for each of the two or more seller sites and for each specific product and each product category level in the standardized taxonomy schema and associate the computed metric with each of the nodes of the standardized taxonomy as applied to each of the two or more seller sites.

33. The system of claim 28 wherein the a data center is configured to receive messages by a method selected from the group comprising:
Javascript messages from Javascript embedded on website pages; an HTML image; a proxy server forwarder or signed browser applet; server-to-server communications in a CGI application, a SOAP call, an XML message, a Web log, spreadsheet or a proprietary protocol to convey data; and a persistent browser cookie combined with JavaScript technology.

34. The system of claim 28 wherein the computer processor is further programmed to derive the sales metric from the group comprising: sales revenue, unit sales, average order size, average shipping charges, average discount; purchase conversion rate; profit margin; profit; return on advertising spend; success of various marketing channels, peak transaction days and times, most popular promotions, best selling products; distribution statistics on order size, distribution statistics on shipping charges, distribution statistics on discounts; and any pricing statistic.

35. The system of claim 28 wherein the computer processor further is programmed to apply to the activity messages a fraud filter to detect transactions that are not legitimate messages from a seller site that subscribes to activities of the data center.

36. The system of claim 28 wherein the computer processor is further programmed to map a product and a product category schema of a seller site into and out of the standardized taxonomy schema for configuring reports using the product and a product category schema of the seller site.

37. A computer-based system for cataloging and reporting Internet merchant data comprising:
a data center configured to receive a plurality of site activity messages regarding two or more seller sites;
a computer processor coupled to computer readable memory and programmed to:
retrieve a standardized taxonomy schema in the form of a tree having at least a specific product level with a node for each of two or more products and a product category level with at least one node that encompasses two or more products from the specific product level;
derive from the plurality of site activity messages a sales metric for each of the two or more seller sites and for the two or more products and for each product category level in the standardized taxonomy schema;
aggregate for a specific time period the sales metric data for each of the two or more seller sites and the two or more products;
associate the computed metric with each of the nodes of the standardized taxonomy as applied to each of the two or more seller sites;
derive for at least one seller site a profile vector by selecting specific product or product category nodes by identifying at least one node and an associated computed metric for the at least one seller site that exceeds a materiality threshold M % and defines a profile vector with reference to such at least one node responsive to the level of the computed metric for each product or product category node; and
derive a comparative report for the sales metric for the two or more seller sites, by reference to at least one of the two or more products in the standardized taxonomy schema wherein the two or more seller sites that are compared share similar seller site profile vectors.

38. The system of claim 37 wherein the profile vector takes the form:
{product/category1/$X_1$%, product/category2/$X_2$%, product/category3/$X_3$%, . . . product/categoryN/$X_N$%} where, product/categoryN is a product or product category node label in the standardized taxonomy and $X_N$ is a associated sales metric greater than or equal to M %.

39. A computer-based system for cataloging and reporting Internet merchant data comprising:
a data center configured to receive a plurality of site activity messages regarding two or more seller sites;
a computer processor coupled with computer readable memory and programmed to:
retrieve from the computer readable memory a standardized taxonomy schema in the form of a tree having at least a specific product level with a node for each of two or more products and a product category level with at least one node that encompasses two or more products from the specific product level;
derive from the plurality of site activity messages a sales metric for each of the two or more seller sites and for the two or more products and for each product category level in the standardized taxonomy schema;
retrieve from computer readable memory a contribution threshold C; apply a dampening algorithm to the computed sales metric when a computed sales metric associated with one of the nodes of the standardized taxonomy exceeds the contribution threshold C ;
aggregate for a specific time period the sales metric data for each of the two or more seller sites and the two or more products;
associate the computed metric with each of the nodes of the standardized taxonomy as applied to each of the two or more seller sites;
derive a profile vector by selecting specific product or product category nodes by identifying at least one node and an associated computed metric for the two or more seller sites and defining a profile vector with reference to such at least one node that reflects the level of the computed metric for each product or product category node; and
derive a comparative report for the sales metric for the two or more seller sites, by reference to at least one of the two or more products in the standardized taxonomy schema wherein the two or more seller sites that are compared share similar seller site profile vectors.

40. The system of claim 39 wherein the dampening algorithm uses a reduction factor applied iteratively to the computed metric until the computed metric associated with the one of the nodes of the standardized taxonomy that exceeds the contribution threshold C no longer exceeds C.

41. The system of claim 39 wherein the dampening algorithm removes from a report the identity of a seller site that exceeds the contribution threshold C.

42. The system of claim 39 wherein the dampening algorithm reduces for reporting purposes the computed metric of a seller site that exceeds the contribution threshold C.

* * * * *